US012024824B2

(12) United States Patent
Machida et al.

(10) Patent No.: US 12,024,824 B2
(45) Date of Patent: Jul. 2, 2024

(54) POLYIMIDE FIBER PAPER USING THERMOPLASTIC POLYMER

(71) Applicants: DU PONT-TORAY CO., LTD., Tokyo (JP); TOYOTA TSUSHO MATEX CORPORATION, Osaka (JP)

(72) Inventors: Hideaki Machida, Tokyo (JP); Gen Ueta, Tosa (JP); Naruaki Takahashi, Tokyo (JP)

(73) Assignees: DU PONT-TORAY CO., LTD. (JP); TOYOTA TSUSHO MATEX CORPORATION (JP)

( * ) Notice: Subject to any disclaimer, the term of this patent is extended or adjusted under 35 U.S.C. 154(b) by 397 days.

(21) Appl. No.: 17/431,862

(22) PCT Filed: Feb. 18, 2020

(86) PCT No.: PCT/JP2020/006276
§ 371 (c)(1),
(2) Date: Feb. 8, 2022

(87) PCT Pub. No.: WO2020/171061
PCT Pub. Date: Aug. 27, 2020

(65) Prior Publication Data

US 2022/0186440 A1 Jun. 16, 2022

(30) Foreign Application Priority Data

Feb. 19, 2019 (JP) ................................ 2019-027263

(51) Int. Cl.

| | |
|---|---|
| ***D21H 13/26*** | (2006.01) |
| ***H01B 3/30*** | (2006.01) |
| ***H01B 3/52*** | (2006.01) |

(52) U.S. Cl.
CPC ............ *D21H 13/26* (2013.01); *H01B 3/306* (2013.01); *H01B 3/52* (2013.01)

(58) Field of Classification Search
CPC .......... D21H 13/26; H01B 3/306; H01B 3/52
See application file for complete search history.

(56) References Cited

U.S. PATENT DOCUMENTS

2020/0115852 A1* 4/2020 Machida ............... D21H 13/26

FOREIGN PATENT DOCUMENTS

| | | | |
|---|---|---|---|
| CN | 106436441 | A | 2/2017 |
| JP | 2000-154491 | A | 6/2000 |
| JP | 2001-192955 | A | 7/2001 |

(Continued)

OTHER PUBLICATIONS

International Search Report (English and Japanese) of the International Searching Authority issued in PCT/JP2020/006276, dated Apr. 21, 2020; ISA/JP (5 pages).

*Primary Examiner* — Anthony Calandra
(74) *Attorney, Agent, or Firm* — Harness, Dickey & Pierce, P.L.C.

(57) ABSTRACT

A method is provided for manufacturing a polyimide fiber paper intermediate structure, which includes: a short fiber preparing step for preparing shaved short fibers of a non-thermoplastic polyimide; and an intermediate structure forming step for forming a polyimide fiber paper intermediate structure in which the short fibers are temporarily bonded using a water-soluble and/or water-insoluble thermoplastic polymer having a melting point lower than a glass transition point of a polyimide.

9 Claims, 23 Drawing Sheets

(56) References Cited

FOREIGN PATENT DOCUMENTS

| | | | | |
|---|---|---|---|---|
| JP | 2003-096698 | A | 4/2003 | |
| JP | 2006-176906 | A | 7/2006 | |
| JP | 2006-176907 | A | 7/2006 | |
| JP | 2009-097117 | A | 5/2009 | |
| WO | 2019-031506 | A1 | 2/2019 | |
| WO | WO-2019031506 | A1 * | 2/2019 | ............. D21H 13/26 |

* cited by examiner

Cylindrical Net Yankee Papermaker

Calendaring Machine

Heat-Press Molding Machine

Air-Pressure Molding Machine

Mesh Belt Furnace

POLYIMIDE FIBER PAPER USING THERMOPLASTIC POLYMER

BACKGROUND

Technical Field

The present invention relates to a polyimide fiber paper using a thermoplastic polymer.

Background Art

Polyimide films are materials excellent in electric insulation, heat resistance, cold resistance, flame retardancy, chemical resistance, and mechanical characteristics, and have been increasingly demanded in a wide range of fields from aerospace applications to automotive and communication equipment applications. However, for the polyimide films, heat insulation, gas and liquid permeability are limited due to characteristics of films. A flexible sheet product in which these characteristics are improved while exploiting a high functionality of polyimide has been expected to be developed. In general, increase in a thickness of a polyimide film leads to a high cost and a high weight. Thus, there has been a demand for development of a thick and lightweight polyimide sheet product with a low cost.

A method of producing a polyimide nonwoven fabric material using polyimide fibers is exemplified by techniques described in Patent Document 1 and Patent Document 2.

PRIOR ART DOCUMENTS

Patent Documents

Patent Document 1: Japanese Patent Application Laid-Open No. 2003-96698

Patent Document 2: Japanese Patent Application Laid-Open No. 2009-97117

Problem to be Solved

Patent Document 1 describes a nonwoven fabric manufacturing method in which polyimide short fibers are thermally welded to each other by heating the fibers to a temperature equal to or higher than a glass transition point of a polyimide. Since the fibers are heated to the glass transition point of the polyimide or higher in the manufacture method of Patent Document 1, there is a problem that the inherent effect of the polyimide is lost or at least reduced.

In addition, the method of manufacturing a polyimide material described in the Patent Document 2 is made only of a non-thermoplastic polyimide with a high heat resistance, but has problems that a special manufacturing apparatus is required and that it is difficult and expensive to achieve a uniform thickness, particularly to obtain a wide sheet product, because of a step that a polyimide precursor solution is spun, drawn with a high-speed airflow, captured on a base material, and then imidized.

SUMMARY

Thus, in order to solve the above problem, the present invention provides a polyimide fiber paper manufacturing method using the following thermoplastic polymer. That means, as a first invention, a method for manufacturing a polyimide fiber paper intermediate structure X is provided, which includes: a short fiber preparing step for preparing shaved short fibers of a non-thermoplastic polyimide; and an intermediate structure X forming step for forming a polyimide fiber paper intermediate structure X in which the short fibers are temporarily bonded using a water-soluble and/or water-insoluble thermoplastic polymer having a melting point lower than a glass transition point of a polyimide.

Next, as a second invention, a method for manufacturing a polyimide fiber paper intermediate structure Z1 is provided, which includes: a short fiber preparing step for preparing a shaved short fibers of a non-thermoplastic polyimide; an intermediate structure X forming step for forming a polyimide fiber paper intermediate structure X in which the short fibers are temporarily bonded using a water-soluble and/or water-insoluble thermoplastic polymer having a melting point lower than a glass transition point of a polyimide; and an intermediate structure Z1 forming step for forming a polyimide fiber paper intermediate structure Z1 by dispersing a polyimide solution and/or polyimide precursor in the polyimide fiber paper intermediate structure X.

Next, as a third invention, a method for manufacturing a polyimide fiber paper intermediate structure Y1 is provided, which includes: a short fiber preparing step for preparing a shaved short fibers of a non-thermoplastic polyimide; an intermediate structure X forming step for forming a polyimide fiber paper intermediate structure X in which the short fibers are temporarily bonded using a water-soluble and/or water-insoluble thermoplastic polymer having a melting point lower than a glass transition point of a polyimide; and a polyimide fiber paper intermediate structure Y1 forming step for forming a polyimide fiber paper intermediate structure Y1 by pressing the heated polyimide fiber paper intermediate structure X to decrease its thickness.

Next, as a fourth invention, a method for manufacturing a polyimide fiber paper intermediate structure Y2 is provided, which includes: a short fiber preparing step for preparing a shaved short fibers of a non-thermoplastic polyimide; an intermediate structure X forming step for forming a polyimide fiber paper intermediate structure X in which the short fibers are temporarily bonded using a water-soluble and/or water-insoluble thermoplastic polymer having a melting point lower than a glass transition point of a polyimide; and a polyimide fiber paper intermediate structure Y2 forming step for forming a polyimide fiber paper intermediate structure Y2 by heating the polyimide fiber paper intermediate structure X to increase its thickness.

Next, as a fifth invention, a method for manufacturing a polyimide fiber paper intermediate structure Z2 is provided, which includes: a short fiber preparing step for preparing a shaved short fibers of a non-thermoplastic polyimide; an intermediate structure X forming step for forming a polyimide fiber paper intermediate structure X in which the short fibers are temporarily bonded using a water-soluble and/or water-insoluble thermoplastic polymer having a melting point lower than a glass transition point of a polyimide; a polyimide fiber paper intermediate structure Y1 forming step for forming a polyimide fiber paper intermediate structure Y1 by pressing the heated polyimide fiber paper intermediate structure X to decrease its thickness; and a polyimide fiber paper intermediate structure Z2 forming step for forming a polyimide fiber paper intermediate structure Z2 by dispersing a polyimide solution and/or polyimide precursor in the polyimide fiber paper intermediate structure Y1.

Next, as a sixth invention, a method for manufacturing a polyimide fiber paper intermediate structure Z3 is provided, which includes: a short fiber preparing step for preparing a shaved short fibers of a non-thermoplastic polyimide; an intermediate structure X forming step for forming a polyimide fiber paper intermediate structure X in which the short fibers are temporarily bonded using a water-soluble and/or water-insoluble thermoplastic polymer having a melting point lower than a glass transition point of a polyimide; a polyimide fiber paper intermediate structure Y2 forming step for forming a polyimide fiber paper intermediate structure Y2 by heating the polyimide fiber paper intermediate structure X to increase its thickness; and a polyimide fiber paper intermediate structure Z3 forming step for forming a polyimide fiber paper intermediate structure Z3 by dispersing a polyimide solution and/or polyimide precursor in the polyimide fiber paper intermediate structure Y2.

Next, as a seventh invention, a method for manufacturing a polyimide fiber paper PP1 is provided, which has: a short fiber preparing step for preparing a shaved short fibers of a non-thermoplastic polyimide; an intermediate structure X forming step for forming a polyimide fiber paper intermediate structure X in which the short fibers are temporarily bonded using a water-soluble and/or water-insoluble thermoplastic polymer having a melting point lower than a glass transition point of a polyimide; an intermediate structure Z1 forming step for forming a polyimide fiber paper intermediate structure Z1 by dispersing a polyimide solution and/or polyimide precursor in the polyimide fiber paper intermediate structure X; and an imidization step for imidizing the polyimide precursor contained in the polyimide solution or the polyimide precursor dispersed not in the form of the polyimide solution in the polyimide fiber paper intermediate structure Z1.

Next, as an eighth invention, a method for manufacturing a polyimide fiber paper PP2 is provided, which includes: a short fiber preparing step for preparing a shaved short fibers of a non-thermoplastic polyimide; an intermediate structure X forming step for forming a polyimide fiber paper intermediate structure X in which the short fibers are temporarily bonded using a water-soluble and/or water-insoluble thermoplastic polymer having a melting point lower than a glass transition point of a polyimide; a polyimide fiber paper intermediate structure Y1 forming step for forming a polyimide fiber paper intermediate structure Y1 by pressing the heated polyimide fiber paper intermediate structure X to decrease its thickness; a polyimide fiber paper intermediate structure Z2 forming step for forming a polyimide fiber paper intermediate structure Z2 by dispersing a polyimide solution and/or polyimide precursor in the polyimide fiber paper intermediate structure Y1; and an imidization step for imidizing the polyimide precursor contained in the polyimide solution or the polyimide precursor dispersed not in the form of the polyimide solution in the polyimide fiber paper intermediate structure Z2.

Next, as a ninth invention, a method for manufacturing a polyimide fiber paper PP3 is provided, which includes: a short fiber preparing step for preparing a shaved short fibers of a non-thermoplastic polyimide; an intermediate structure X forming step for forming a polyimide fiber paper intermediate structure X in which the short fibers are temporarily bonded using a water-soluble and/or water-insoluble thermoplastic polymer having a melting point lower than a glass transition point of a polyimide; a polyimide fiber paper intermediate structure Y2 forming step for forming a polyimide fiber paper intermediate structure Y2 by heating the polyimide fiber paper intermediate structure X to increase its thickness; a polyimide fiber paper intermediate structure Z3 forming step for forming a polyimide fiber paper intermediate structure Z3 by dispersing a polyimide solution and/or polyimide precursor in the polyimide fiber paper intermediate structure Y2; and an imidization step for imidizing the polyimide precursor contained in the polyimide solution or the polyimide precursor dispersed not in the form of the polyimide solution in the polyimide fiber paper intermediate structure Z3.

Effect of Invention

The present invention makes it possible to manufacture polyimide fiber paper in which a content of the thermoplastic polyimide component in a constituent material is approximately 100%. The present invention can provide a method for manufacturing a material which can sufficiently exhibit characteristics inherent to the non-thermoplastic polyimide, and is excellent in heat resistance, flame retardancy, electric insulation, heat insulation, and lightness.

Also, the polyimide fiber paper or an intermediate structure thereof according to the present invention can be laminated together with another material by using adhesiveness of the intermediate structure, so that a composite material for enhancing or adding characteristics can be provided.

DETAILED DESCRIPTION

Hereinafter, the embodiments of the present invention will be explained with reference to the figures. In the following description, Embodiments 1, 2, 3, 4, 5, 6, 7, 8, and 9 correspond to claims 1, 2, 3, 4, 5, 6, 7, 8, and 9, respectively. It should be noted that the contents of the present invention are not limited to the following embodiments and may be variously modified without departing from the gist of the present invention.

Embodiment 1

Embodiment 1 mainly corresponds to claim 1.

Embodiment 1. Summary

This embodiment of the present invention relates to a method for manufacturing a fiber paper intermediate structure X of a non-thermoplastic polyimide using a thermoplastic polymer.

Embodiment 1. Configuration of Invention

Figure 1:
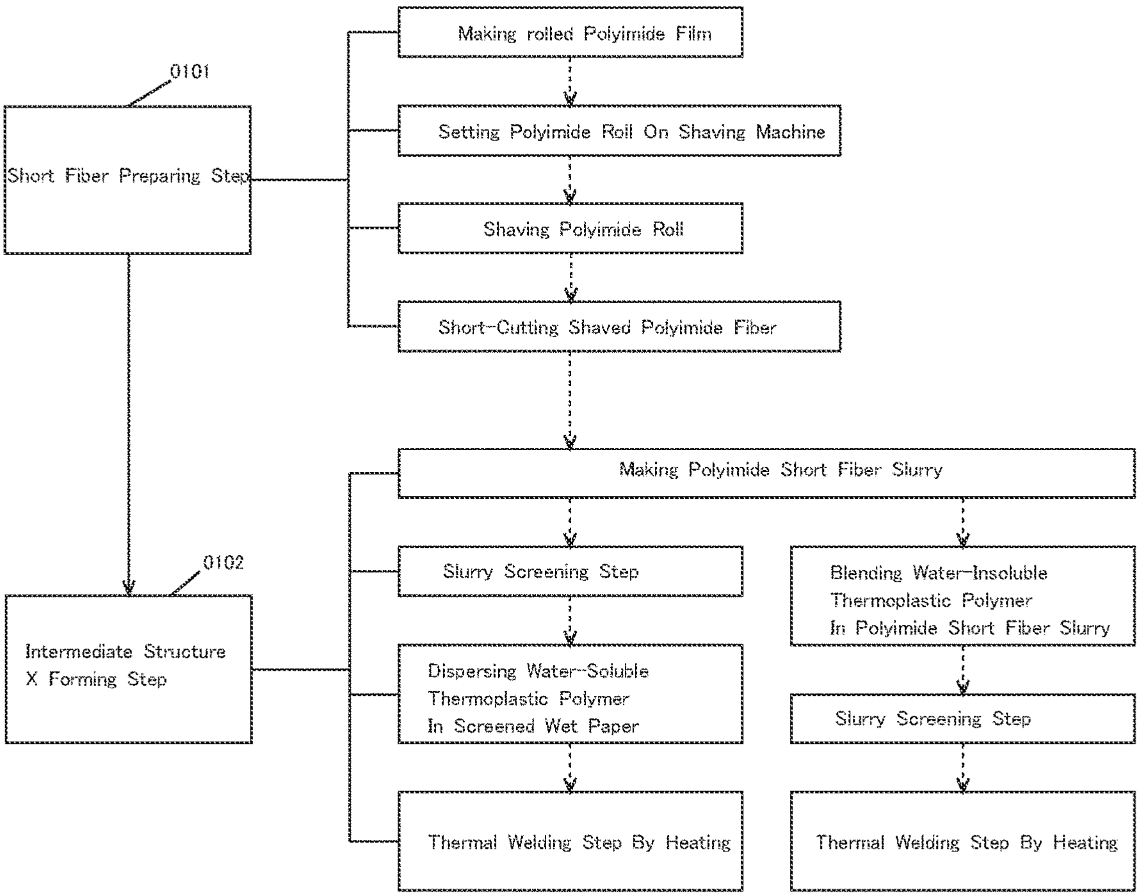
FIG. 1 is a flow chart illustrating an example of a method for manufacturing an intermediate structure X in manufacture of a polyimide fiber paper using a thermoplastic polymer in Embodiment 1.

The manufacture method of this embodiment of this invention includes a short fiber preparing step 0101 and an intermediate structure X forming step 0102, as illustrated in FIG. 1.

Embodiment 1. Description of Configuration

Embodiment 1. Short Fiber Preparing Step

Figure 2:
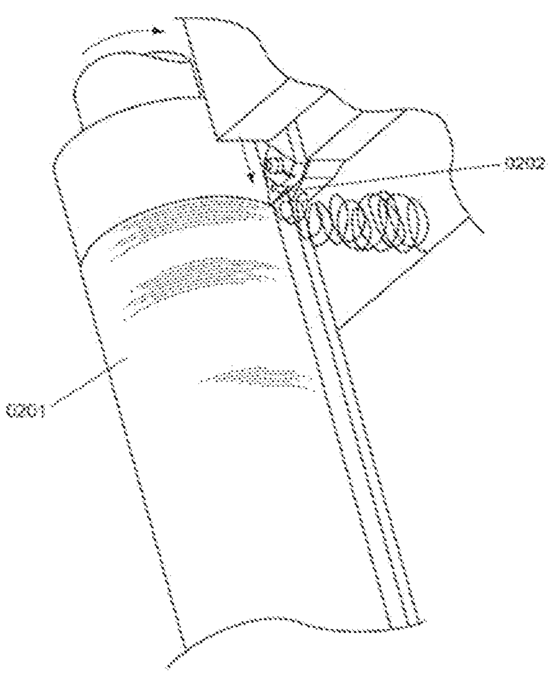
FIG. 2 is a diagram illustrating an example of a method for shaving polyimide fibers from a polyimide film roll in a short fiber preparing step in a method for manufacturing the polyimide fiber paper using the thermoplastic polymer in Embodiment 1.

In the "short fiber preparing step" 0101, shaved short fibers of the non-thermoplastic polyimide are prepared. A method for shaving the non-thermoplastic polyimide may be, e.g., a process using a shaving machine as illustrated in FIG. 2. A film-like non-thermoplastic polyimide is winded (0201), the roll is fixed to the shaving machine, and the film is shaved under rotation. Diameters of the shaved fibers can be easily adjusted by changing a thickness of the polyimide film, a feed rate of a blade fixed to the shaving machine (0202), a rotation speed of the polyimide film roll, and a size of the blade fixed to the shaving machine. Fibers having small widths can be made more easily than by spinning methods. Furthermore, unlike the case of spinning, the shaved fibers are not straight but have a woolly and twisted form, so that the fibers can easily intertwine with each other. In addition, since the cross sections of the fibers are not circular or elliptical, the short fibers frequently come into contact with each other at their corners (which may be acute angles or obtuse angles) so that a frictional force on a contact area is higher than in the case of the circular or elliptical cross sections. That also contributes the high entanglement force between the short fibers.

Figure 16:
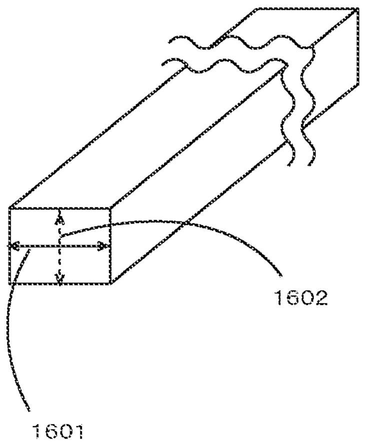
FIG. 16 is a schematic diagram of a shape of the polyimide fiber shaved from the polyimide film roll.

FIG. 16 is a conceptual diagram of the polyimide short fiber. The length indicated by the solid line in FIG. 16 is a width (1601) of the polyimide short fiber, and the length indicated by the dotted line in FIG. 16 is a height (1602) of the polyimide short fiber. The width and the height of the polyimide short fiber may be longer than the other one or may have the same length.

A proper width of the polyimide short fiber is 1 μm to 100 μm. Flexibility of the polyimide short fiber depends on the width of the polyimide short fiber. A thick fiber has low flexibility and is difficult to bend, and a thin fiber has high flexibility and is easy to bend. Thus, complexity of the entanglement between the polyimide short fibers themselves or between the polyimide short fiber and the water-soluble polymer depends on the width of the polyimide short fiber. When the entanglement is simple, the polyimide short fibers may be loosened from the intertwining state by a slight impact, and a strength of the finished paper is weak. On the other hand, when the entanglement is excessively complicated, the intertwining parts overlap with each other to become thicker so that the finished paper is unsmooth, resulting in paper with insufficient integrity. Thus, there is a proper width described above for the width of the polyimide short fiber.

As described above, the polyimide short fiber is shaved by applying the blade to a side face of the polyimide film roll. The height of the polyimide short fiber depends on the thickness of the polyimide film, and the width of the polyimide short fiber is adjusted by the blade that shaves the film from the side face. A polyimide film having a thickness of 1 μm to 50 μm is suitable for the roll of the polyimide film from which the polyimide short fibers are cut out in making the polyimide fiber paper. Furthermore, a polyimide film having a thickness of 3 μm to 25 μm is optimal for the roll of the polyimide film from which the polyimide short fibers are cut out in making the polyimide fiber paper.

When the width and/or height are set to a width and/or height that are equal to or smaller than the lower limits of the aforementioned width and height conditions, the strength of the short fibers themselves is weak, and therefore, even if the strength of the bonding points where the short fibers intertwine with each other is enough, the paper tends to tear at portions other than the bonding points. When the width and/or height are set to a width and/or height that are equal to or larger than the upper limits of the aforementioned width and height conditions, the diameters of the shaved short fibers are large, and these fibers with the short fiber lengths do not intertwine well.

The shaved fibers have a long fiber length and do not have the short fiber shape only by the aforementioned process. Thus, in the short fiber preparing step, the fibers should be subjected to short-cutting for further cutting the polyimide fibers shaved from the polyimide film roll into shorter fiber lengths. The polyimide short fibers after the short-cutting are uniformed so as to have the fiber lengths of about 1 mm to 10 mm. With the fiber length less than 1 mm, the entanglement between the polyimide short fibers and between each polyimide short fiber and a water-insoluble thermoplastic polymer as a binder described later is insufficient even if wet papermaking is performed, and it is difficult to maintain the strength and the form of the paper. On the other hand, with the fiber length of 10 mm or larger, the fibers intertwine with each other well, but the intertwining parts overlap with each other, and therefore it is difficult to uniform the thickness of paper.

The width and length of the fiber can be freely selected in any combination, and the width and length of the fiber can be varied according to the application of the polyimide fiber paper so as to make a polyimide fiber paper having various strengths and durability. Incidentally, the "polyimide" refers to a generic name for polymers having imide bonds in repeating units, and generally refers to an aromatic polyimide in which aromatic compounds are bonded to each other via an imide bond. The aromatic polyimide has a rigid and strong molecular structure because of a conjugate structure of the aromatic compounds via the imide bond, and has the highest level of thermal, mechanical, and chemical properties among all polymers because of a strong intermolecular force of the imide bond. The aromatic polyimide generally has the following physical properties: an elastic modulus of 3 to 10 GPa, a tensile break strength of 200 to 600 MPa, a tensile break elongation of 40 to 90%, a linear expansion coefficient of 0 to 50 ppm/° C., and a thermal decomposition temperature of 350° C. or higher.

Embodiment 1. Intermediate Structure X Forming Step

Figure 3:
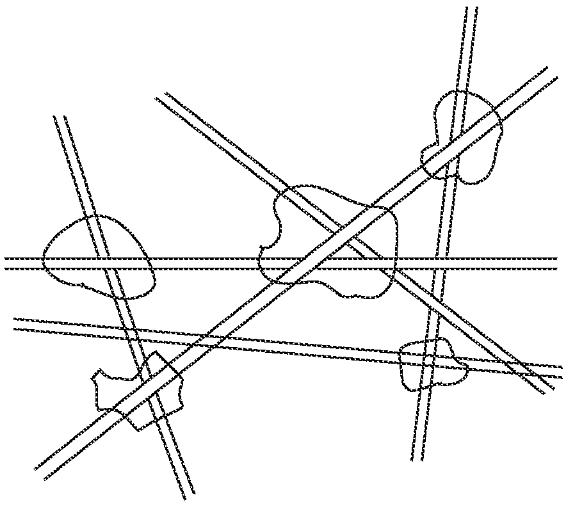
FIG. 3 is a conceptual diagram of a state that a water-soluble and/or water-insoluble thermoplastic polymer is thermally welded in an intermediate structure X forming step in manufacture of the polyimide fiber paper using the thermoplastic polymer in Embodiment 1.
Figure 17:
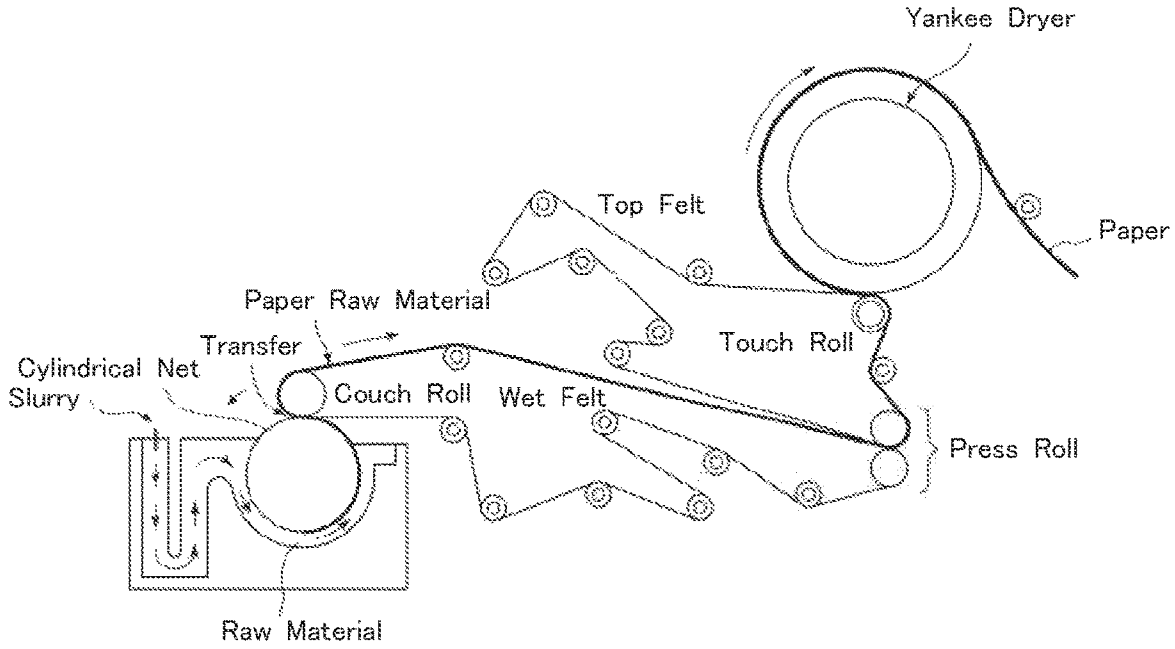
FIG. 17 is a schematic configuration diagram of a cylindrical net yankee papermaker in the present embodiments.

In the "intermediate structure X forming step" 0102, the polyimide fiber paper intermediate structure is formed in which the short fibers are temporarily bonded using a water-soluble and/or water-insoluble thermoplastic polymer having a melting point lower than a glass transition point of the polyimide. In the intermediate structure X forming step, the intermediate structure X having a part temporarily bonded as illustrated in FIG. 3 can be formed by a step in which a water-soluble thermoplastic polymer is dispersed in a wet paper screened from a slurry having dispersed polyimide short fibers, and/or a step in which a binder-dispersed slurry composed by dispersing polyimide short fibers and the water-insoluble thermoplastic polymer as a binder in water is continuously screened using a machine (cylindrical net yankee papermaker as illustrated in FIG. 17) and dried by heat of a yankee dryer. The shaved polyimide short fibers accumulating in a raw material tank are dispersed in a solution containing a dissolved water-soluble thermoplastic polymer having a melting point lower than the glass transition point of the polyimide short fibers, or are dispersed in a solution with a water-insoluble thermoplastic polymer, then scooped up with a cylindrical net, and the fiber paper intermediate adhering the surface of the net is pressurized by a couch roll and transferred to a wet felt. The fiber paper intermediate is press-rolled on the wet felt and moved to a top felt while removing water so that it is transferred from the wet felt to the top felt. The fiber paper intermediate may be dried by hot air or the like to form the polyimide fiber paper intermediate structure X. Alternatively, the fiber paper intermediate may be dried by touch-rolling on the yankee dryer unit at a low temperature (80° C. to 90° C.) or at a certain high temperature (90° C. to 180° C.) to form the polyimide fiber paper intermediate structure X.

Figure 4:
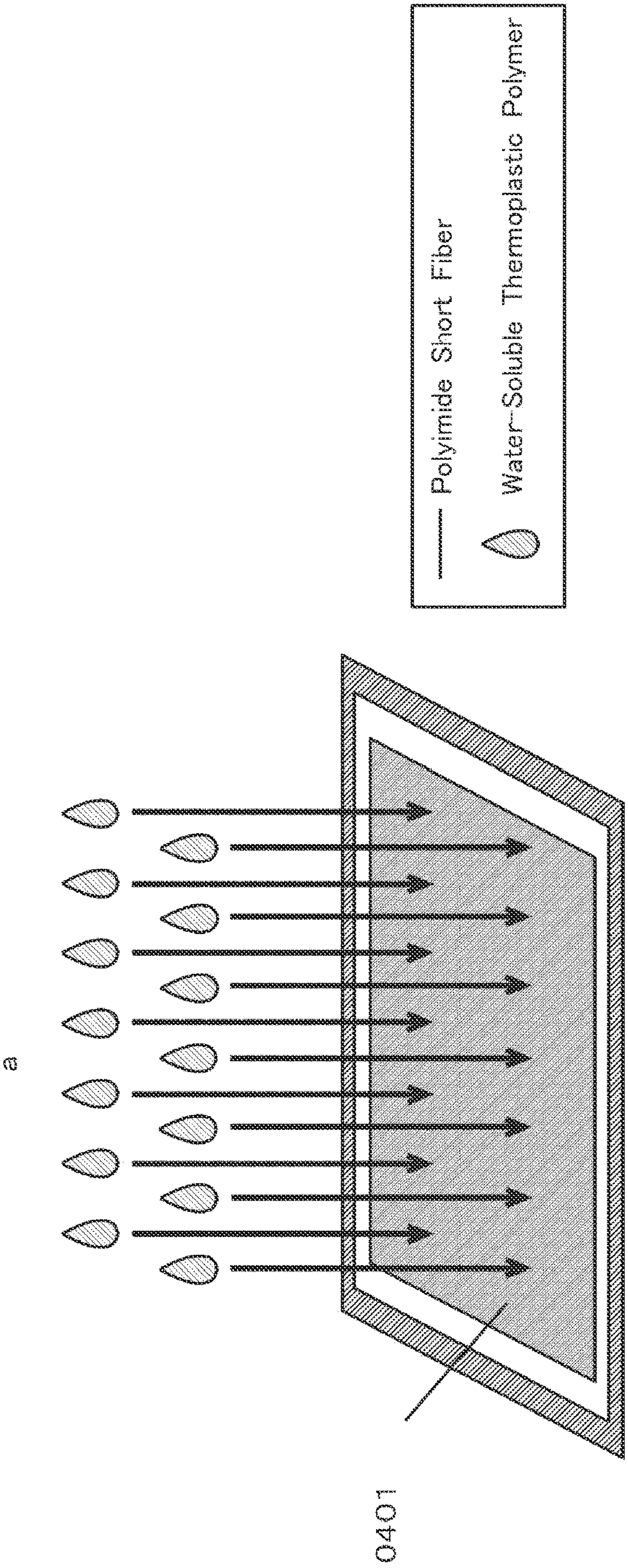
FIG. 4 is a conceptual diagram of a method for dispersing the water-soluble thermoplastic polymer in the intermediate structure X forming step in manufacture of the polyimide fiber paper using the thermoplastic polymer in Embodiment 1.
Figure 6A:
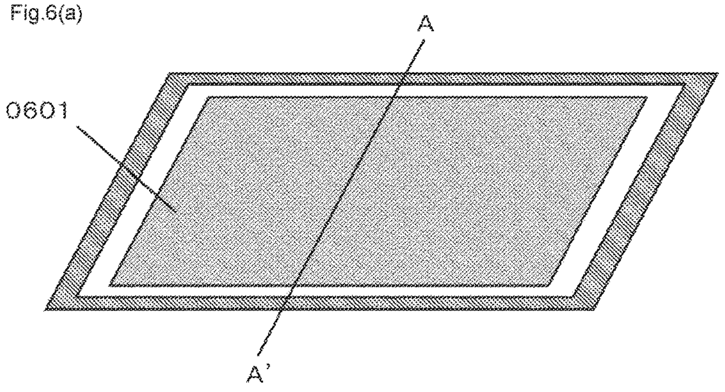
FIGS. 6(*a*)-6(*c*) are conceptual diagrams of a state that the water-soluble and/or water-insoluble thermoplastic polymer is dispersed in a wet paper screened in the intermediate structure X forming step in manufacture of the polyimide fiber paper using the thermoplastic polymer in Embodiment 1.
Figure 6B:
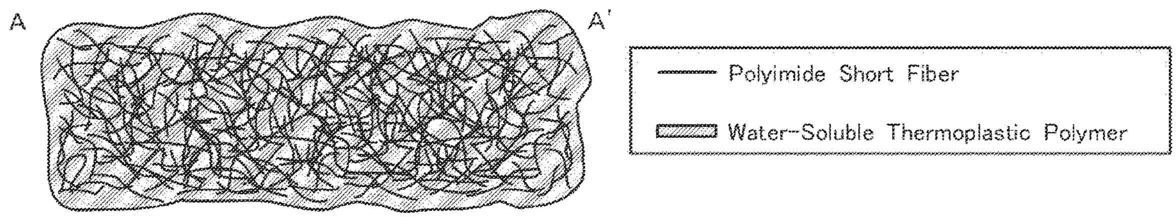
Figure 6C:
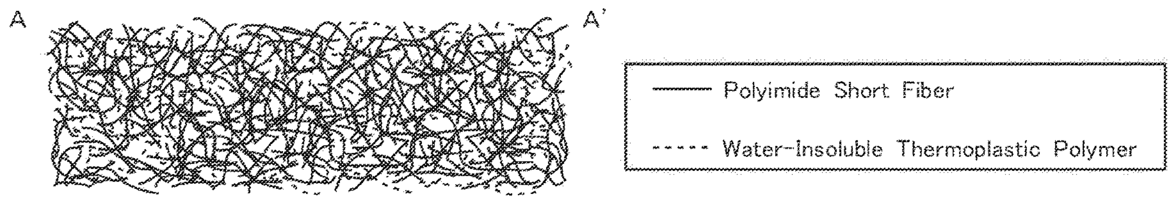

Embodiment 1. Intermediate Structure X Forming Step: Dispersion of Water-Soluble Thermoplastic Polymer Since the water-soluble thermoplastic polymer is water-soluble, the water-soluble thermoplastic polymer dissolves in the slurry when being stirred in the slurry obtained by dispersing the polyimide short fibers in water, and therefore, when screening the polyimide short fibers, the water-soluble thermoplastic polymer cannot be screened together with the polyimide short fibers. When dispersing the water-soluble thermoplastic polymer, a slurry of only the polyimide short fibers is screened (0401), to which the water-soluble thermoplastic polymer is subsequently dispersed, as illustrated in FIG. 4. FIG. 6(*b*) is a conceptual sectional view of a wet paper (0601) taken along A-A' from FIG. 6(*a*). Hereinafter, the wet paper obtained by dispersing the water-soluble thermoplastic polymer in the screened wet paper will be referred to as a wet paper A for the sake of convenience. FIG. 6(*b*) is a conceptual diagram of a state that the water-soluble thermoplastic polymer is dispersed in the wet paper A. A film of the water-soluble thermoplastic polymer is formed around the wet paper A in which the polyimide short fibers intertwine with each other, and the water-soluble thermoplastic polymer is distributed so as to cover the whole wet paper. Incidentally, other ingredients, e.g., a flame retardant may also be compounded into the water-soluble thermoplastic polymer solution. Examples of the flame retardant include a flame retardant composed of a powdered phosphonate compound, and a halogenated aliphatic compound or its derivative excluding halogenated cyclic aliphatic compounds.

After dispersing the water-soluble thermoplastic polymer, the wet paper is heated so as to thermally weld the water-soluble thermoplastic polymer. The heating temperature for the thermal welding is a temperature at which water evaporates, the thermoplastic polymer solidifies to form a film. The thermoplastic polymer solidifies by the heating, so that the contact points of the polyimide short fibers are bonded. Since the steps after the dispersion step are common with those for the water-insoluble thermoplastic polymer, the details of these steps will be described later together with explanation of the water-insoluble thermoplastic polymer.

Example 1. Intermediate Structure X Forming Step 0102: Dispersion of Water-Insoluble Thermoplastic Polymer On the other hand, the water-insoluble thermoplastic polymer has a fibrous form similar to that of the polyimide short fibers so as to intertwine with the polyimide short fibers during the screening. The fiber length preferably ranges 1 mm to 20 mm, and the fiber diameter preferably ranges 1 μm and 100 μm. If the fiber length is smaller than 1 mm, the entanglement with the polyimide short fibers is weakened, and the wet paper is poorly formed when screening the slurry. If the fiber length is larger than 20 mm, the area for thermally welding the polyimide short fibers is excessively increased, and a polyimide density on the surface of the intermediate structure X is excessively decreased, resulting in an intermediate structure that cannot sufficiently exert the properties of the polyimide. If the fiber diameter is smaller than 1 μm, the area for the thermal welding is excessively decreased, and the strength of the intermediate structure X is decreased. If the fiber diameter is larger than 100 μm, the thermoplastic polymer fibers tense and do not sufficiently intertwine with the polyimide short fibers, and therefore the wet paper is poorly formed when screening the slurry.

Figure 5:
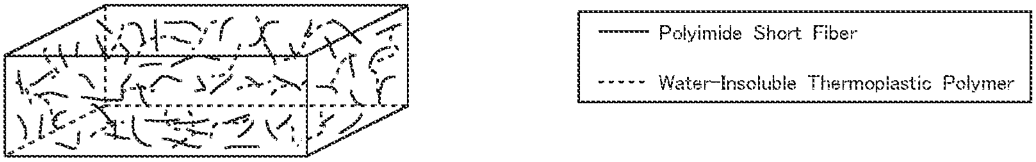
FIG. 5 is a conceptual diagram of a state that the water-insoluble thermoplastic polymer is stirred in a slurry obtained by dispersing polyimide short fibers in water in the intermediate structure X forming step in manufacture of the polyimide fiber paper using the thermoplastic polymer in Embodiment 1.

The water-insoluble thermoplastic polymer is stirred in the slurry obtained by dispersing the polyimide short fibers in water. Since the water-insoluble thermoplastic polymer does not dissolve in water even when stirred in the slurry, the binder-dispersed slurry in which the polyimide short fibers and the water-insoluble thermoplastic polymer are dispersed in water is composed, as conceptually illustrated in FIG. 5.

Hereinafter, the wet paper (0601) that is composed when the binder-dispersed slurry is screened will be referred to as a wet paper B for the sake of convenience. As conceptually illustrated in FIGS. 6(*a*)-6(*c*), the wet paper B is in a state that the polyimide short fibers and the thermoplastic polymer complicatedly intertwine with each other.

After dispersing the water-insoluble thermoplastic polymer, the wet paper is heated so as to thermally weld the water-insoluble thermoplastic polymer. The heating temperature for the thermal welding is a temperature around a melting point of the water-insoluble thermoplastic polymer, equal to or lower than a boiling point of the water-insoluble thermoplastic polymer, equal to or lower than a burning point of the water-insoluble thermoplastic polymer, and equal to or lower than a glass transition point of the polyimide short fibers. The water-insoluble thermoplastic polymer melts by heating so as to be thermally welded. Since the steps after the dispersion step are common with those for the water-soluble thermoplastic polymer, the details of these steps will be described later together with explanation of the water-soluble thermoplastic polymer.

The water-soluble and/or water-insoluble thermoplastic polymers may be, e.g., a polylactic acid, or the like.

Embodiment 1. Intermediate Structure X Forming Step 0102: Water-Soluble and/or Water-insoluble Thermoplastic Polymer Thermally-Welding Step 1

As described above, the water-soluble and/or water-insoluble thermoplastic polymer is thermally welded by heating after the water-soluble and/or water-insoluble thermoplastic polymer dispersing step. The melting point of the water-soluble and/or water-insoluble polymer to be dispersed is set lower than the glass transition point of the polyimide because thermal welding between the water-soluble and/or water-insoluble thermoplastic polymer as the binder and the polyimide short fibers or between the thermoplastic polymers themselves is carried out using a papermaker equipped with a yankee dryer or a multi cylinder dryer generally used for wet papermaking. Since these dryers are configured such that steam is put into a cylinder for heating, a surface temperature of the dryer is typically 100 to 180° C. The glass transition points of most polyimides are 250° C. or higher, and a water-soluble and/or water-insoluble thermoplastic polymer having a melting point lower than this temperature is used.

The thermal welding is performed at a heating temperature around or lower than the melting point of the water-soluble and/or water-insoluble thermoplastic polymer. In the intermediate structure X manufacturing step, as conceptually illustrated in FIG. 3, the intermediate structure X as a temporarily-bonded paper that is temporarily bonded by thermal welding of the thermoplastic polymer is manufactured by welding the thermoplastic polymer through heating from the state of the wet paper. In the conceptual structure of the intermediate structure X which is temporarily bonded by melting the thermoplastic polymer, although there is no significant difference between the case that the wet paper A is thermally welded by heating and the case that the wet paper B is thermally welded by heating, the thermoplastic polymer is more uniformly distributed throughout the wet paper in the wet paper A than in the wet paper B, and therefore it is considered that the wet paper A has relatively more temporary bonding points of the thermal welding than the wet paper B. However, since the thermoplastic polymer is dissolved in the aqueous solution, i.e., diluted with water, a content of the thermoplastic polymer per unit area in the case using the water-soluble thermoplastic polymer is smaller than that in the case using the water-insoluble thermoplastic polymer. Thus, when the wet paper A is thermally welded by heating, relatively weaker temporary bonding points are relatively major, and when the wet paper B is thermally welded by heating, relatively stronger temporary bonding points are relatively minor. Therefore, there is no significant difference in the overall strength between the two.

Embodiment 1. Intermediate Structure X Forming Step 0102: Water-Soluble and/or Water-Insoluble Thermoplastic Polymer Thermally-Welding Step 2

The intermediate structure X is formed by welding the thermoplastic polymer dispersed in the wet paper in which the water-soluble and/or water-insoluble thermoplastic polymer are dispersed so as to temporarily bond the polyimide short fibers. In the case of the water-soluble thermoplastic polymer, the temporary bonding of the polyimide short fibers is carried out by thermal welding in such a way that water is evaporated and solid contents are precipitated to form a film. In the case of the water-insoluble thermoplastic polymer, the temporary bonding is carried out in such a way that the thermoplastic polymer is softened by heating, to bond the polyimide short fibers. In the state of temporary bonding by thermal welding of the thermoplastic polymer, the polyimide short fibers and the thermoplastic polymer are not chemically bonded but are mechanically bonded.

Embodiment 1. Intermediate Structure X Forming Step 0102: Water-Soluble and/or Water-Insoluble Thermoplastic Polymer Thermally-Welding Step 3, Welding Method The method for bonding the polyimide short fibers by welding of the thermoplastic polymer through heating may be a direct heating method or a hot air method, but a rotary dryer that is used in paper manufacture is desirable. Preferably, a drying temperature is set to a range of 110° C. to 300° C. that is lower than the glass transition point of the polyimide. A range of 110° C. to 160° C. is more preferable.

The "thermoplastic polymer" refers to a synthetic resin having such a property that, when heated, it melts to liquefy, and, when cooled, it solidifies. The thermoplastic polymer has such a property that it melts by heat any number of times and solidifies by cooling any number of times. The thermoplastic polymer may be polylactic acid, polyethylene (high-density polyethylene, medium-density polyethylene, low-density polyethylene), polypropylene, polyvinyl chloride, polystyrene, polyvinyl acetate, polyurethane, Teflon (registered trademark), acrylonitrile butadiene styrene resin, AS resin, acrylic resin, polyamide, polyacetal, polycarbonate, modified polyphenylene ether, polyethylene terephthalate, glass fiber-reinforced polyethylene terephthalate, polybutylene terephthalate, cyclic polyolefin, polyphenylene sulfide, polytetrafluoroethylene, polysulfone, polyethersulfone, amorphous polyarylate, liquid crystal polymer, polyetheretherketone, thermoplastic polyimide, polyamideimide, or the like. Above all, especially when using the polylactic acid, toxic substances or odor are rarely caused during the heating step because the polylactic acid is a naturally occurring component. Furthermore, the finished intermediate structure and polyimide fiber paper are relatively less odorous. Thus, the polylactic acid is also excellent as a material that does not adversely affect a human body because the there is no danger of toxic gas and odor is suppressed when the thermoplastic polymer is often exposed to a high temperature as a heat insulating material or used as a heat insulating material in a relatively wide range.

Embodiment 1. Intermediate Structure X Forming Step 0102: Case of Dispersing Both Water-Soluble Thermoplastic Polymer and Water-insoluble Thermoplastic Polymer <Thermoplastic Polymer Dispersion Step>

First, a slurry in which the water-insoluble thermoplastic polymer is stirred in a slurry obtained by dispersing the polyimide short fibers in water (the same configuration as the aforementioned binder-dispersed slurry) is prepared, and the slurry in which the polyimide short fibers and the water-insoluble thermoplastic polymer are dispersed is screened. Subsequently, the water-insoluble thermoplastic polymer is dispersed in the screened wet paper. This process is the method for dispersing the water-soluble thermoplastic polymer and the water-insoluble thermoplastic polymer. When both the water-soluble thermoplastic polymer and the water-insoluble thermoplastic polymer are dispersed in the wet paper, a film of the water-soluble thermoplastic polymer is formed on the wet paper in which the polyimide short fibers and the water-insoluble thermoplastic polymer fiber illustrated in FIG. 6(*c*) complicatedly intertwine with each other so as to cover the circumference of the polyimide short fibers and each fiber of the water-insoluble thermoplastic polymer as illustrated in FIG. 6(*b*).

<Thermal Welding Step>

The wet paper in which the water-soluble thermoplastic polymer and the water-insoluble thermoplastic polymer are dispersed is heated, so that the water-insoluble thermoplastic polymer and/or the water-soluble thermoplastic polymer are thermally welded. The water-insoluble thermoplastic polymer causes relatively strong thermal welding in the vicinity of sites including the fibers, and the water-soluble thermoplastic polymer causes a relatively large number of uneven and relatively weak thermal welding regardless of the arrangement of the polyimide short fibers and the water-insoluble thermoplastic polymer. Thus, compared to the case that the thermal welding is carried out using only the water-insoluble thermoplastic polymer or only the water-soluble thermoplastic polymer, the thermal welding can be caused at a larger number of locations, and therefore a force for fixing the polyimide short fibers is relatively stronger. As is in the aforementioned case, the polyimide short fibers are not chemically fixed but are mechanically fixed.

Embodiment 1. Intermediate Structure X Forming Step: Combination of Water-Soluble Thermoplastic Polymer and Water-insoluble Thermoplastic Polymer The water-soluble and/or water-insoluble thermoplastic polymer used as a binder in the intermediate structure X forming step also includes a configuration in which a plurality of the water-soluble and/or water-insoluble thermoplastic polymers are combined. For example, in a case that there are a substance A and a substance B as the water-soluble thermoplastic polymers and a substance C and a substance D as the water-insoluble thermoplastic polymers, any combination of "A+B", "A+C", "B+C", "A+D", "B+D", "A+B+C", "A+B+D", "A+C+D", "B+C+D", and "A+B+C+D" may be adopted. A combination ratio and a concentration of each substance may be any combination of values.

Depending on the types of the binders to be combined, it may be possible to vary the paper finish, and to make a paper having a different strength and a different polyimide short fiber content per unit area from those in the case using only a single substance. Furthermore, for example, it is conceivable to combining substances having different melting points so that heating is performed at a temperature at which only the water-soluble thermoplastic polymer is thermally welded so as to perform the temporary bonding by thermal welding of the water-soluble thermoplastic polymer while the polyimide short fibers and the water-insoluble thermoplastic polymer are dispersed in the intermediate structure X forming step. Then, the water-insoluble thermoplastic polymer still complicatedly intertwine with the polyimide short fibers even after the temporary bonding step. Therefore, even if the water-soluble thermoplastic polymer dissolves in water again, the wet paper can still maintain its own shape by the entanglement of the polyimide short fibers and/or the water-insoluble thermoplastic polymer.

As described above, by using the water-soluble or water-insoluble thermoplastic polymers having different melting points, the same effect as when using a sheath structure can be obtained without using a water-soluble and/or water-insoluble thermoplastic polymer having the sheath structure.

The intermediate structure X can be manufactured in the process of making the polyimide fiber paper according to the present invention and corresponds to the temporarily-bonded paper of the polyimide short fibers. Since a polyimide content is about 75% to 85% (the components other than the thermally welded thermoplastic polymer as the binder material are non-thermoplastic polyimides), properties of the polyimide such as heat resistance, heat insulation, and electric insulation can be almost completely exhibited. The non-thermoplastic polyimide with high heat resistance has had drawbacks that: it has little elasticity when formed into a paper shape, thus it is difficult to mold; it cannot be laminated with other materials (e.g., paper made of a metal or a so-called pulp, or the like) because of non-heat meltability; and the like. In this regard, since the thermoplastic polymer remains in the temporarily bonded parts of the intermediate structure X, the intermediate structure can be laminated with other substances using adhesiveness of the thermoplastic polymer. Furthermore, at the stage of the intermediate structure X, the polyimide short fibers are not subjected to imidization reaction as described later, therefore the polyimide short fibers are not strongly bonded to each other but laminates of the polyimide short fibers are merely bonded in a loose manner by thermal welding of the thermoplastic polymer. Thus, the intermediate structure X has a certain elasticity and can be deformation for use. The intermediate structure X can be stuck to an object along a shape of the object by being wound around the object and heated.

Embodiment 2

Embodiment 2 mainly corresponds to claim 2.

Embodiment 2. Summary

This embodiment of the present invention relates to a method for manufacturing a polyimide fiber paper intermediate structure Z1 by dispersing a polyimide solution and/or polyimide precursor in the polyimide fiber paper intermediate structure X manufactured by the manufacture method in Embodiment 1.

Embodiment 2. Configuration of Invention

Figure 7:
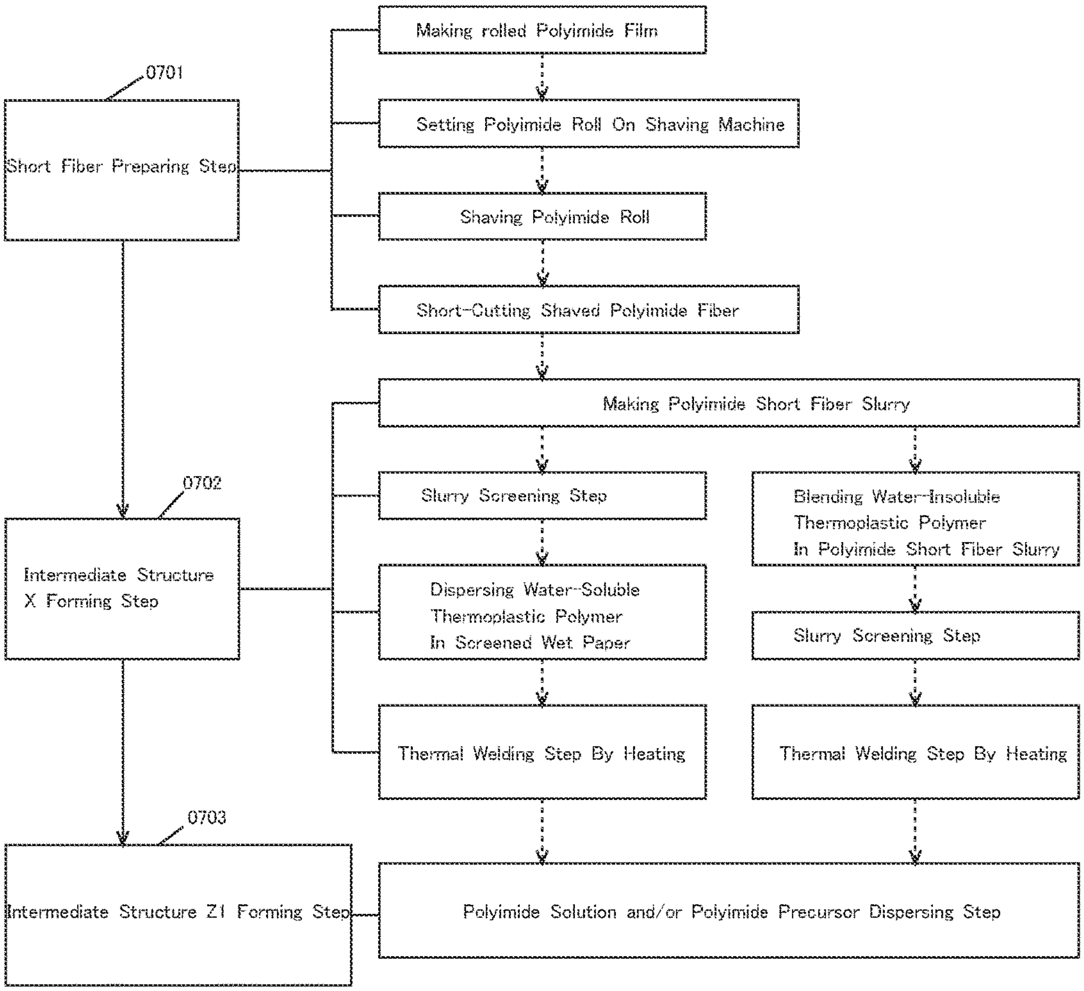
FIG. 7 is a flow chart illustrating an example of a method for manufacturing an intermediate structure Z1 in manufacture of a polyimide fiber paper using a thermoplastic polymer in Embodiment 2.

The manufacture method in this embodiment of the present invention includes a short fiber preparing step 0701, an intermediate structure X forming step 0702, and an intermediate structure Z1 forming step 0703, as illustrated in FIG. 7.

Embodiment 2. Description of Configuration

Embodiment 2. Description of Configuration: Short Fiber Preparing Step

In the short fiber preparing step 0701 in Embodiment 2, shaved short fibers of the non-thermoplastic polyimide are prepared. In this step, polyimide fibers shaved from a polyimide film are subjected to short-cutting to form polyimide short fibers in the same manner as in the short fiber preparing step described in Embodiment 1. Since the description of each step, the materials used in each step, and the materials prepared in each step have already been explained in Embodiment 1, explanation thereof is omitted.

Embodiment 2. Description of Configuration: Intermediate Structure X Forming Step In the intermediate structure X forming step 0702 of Embodiment 2, the polyimide intermediate structure X is formed in which the short fibers are temporarily bonded using a water-soluble and/or water-insoluble thermoplastic polymer having a melting point lower than a glass transition point of the polyimide. Similarly to the intermediate structure X forming step 0102 described in Embodiment 1, the intermediate structure X forming step 0702 in Embodiment 2 includes: the "water-soluble thermoplastic polymer dispersing step in which the slurry obtained by dispersing the shaved polyimide short fibers in water is screened and then the water-soluble thermoplastic polymer is dispersed therein" and/or the "water-insoluble thermoplastic polymer dispersing step in which the binder-dispersed slurry obtained by dispersing the water-insoluble thermoplastic polymer as the binder in the slurry obtained by dispersing the shaved polyimide short fibers in water"; as well as the "intermediate structure X manufacturing step in which the wet paper is dried by heating, and the water-soluble and/or water-insoluble thermoplastic polymer as the binder melts during heating to temporarily bond the polymer by thermal welding". Since each of these steps is similar to the intermediate structure X forming step in Embodiment 1 and has already been explained, explanation thereof is omitted in the present embodiment.

Figure 18:
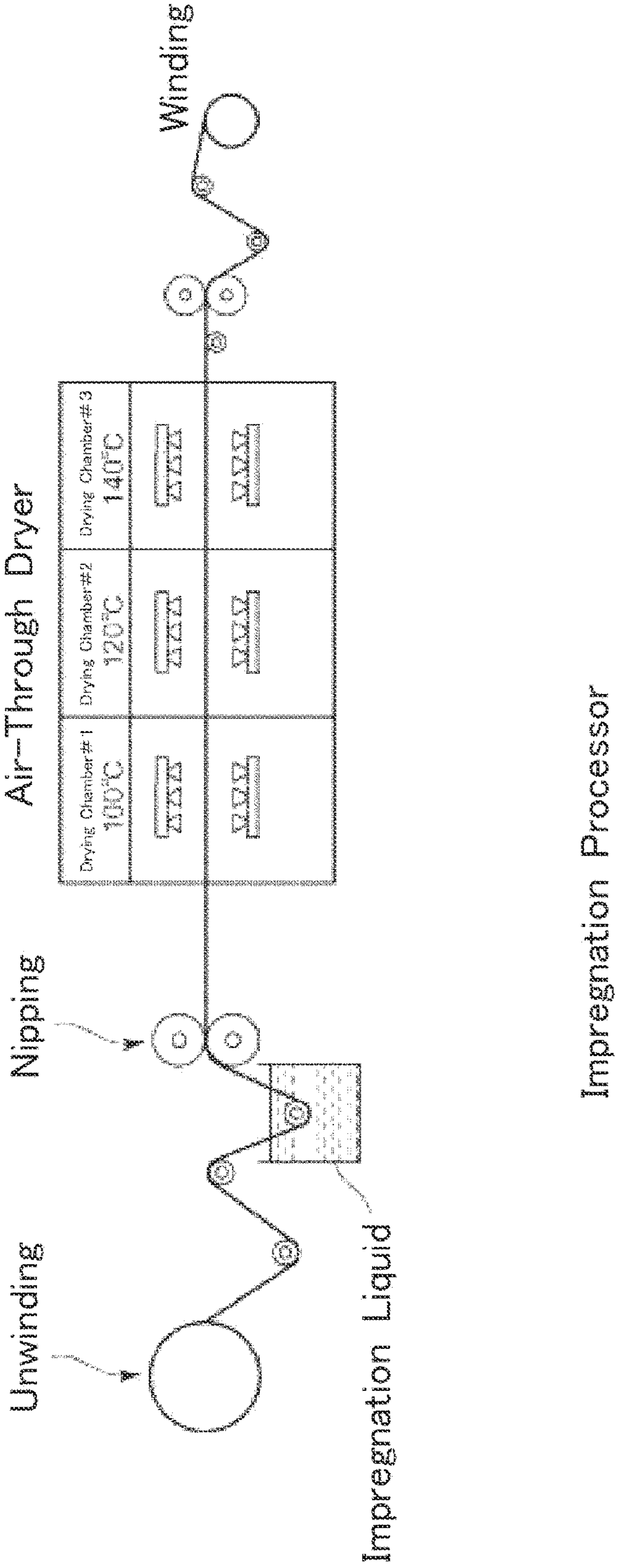
FIG. 18 is a schematic configuration diagram of an impregnation processing machine in the present embodiments.

Embodiment 2. Configuration of Invention: Intermediate Structure Z1 Forming Step In the "intermediate structure Z1 forming step" 0703, a polyimide solution and/or polyimide precursor are dispersed in the polyimide fiber paper intermediate structure X to form the polyimide fiber paper intermediate structure Z1. The step of dispersing the polyimide solution and/or polyimide precursor may be a process in which the polyimide fiber intermediate structure X is soaked in the polyimide solution and/or polyimide precursor, and the polyimide solution and/or polyimide precursor are dispersed by using an impregnation machine (impregnation processing machine as illustrated in FIG. 18) performing nipping to squeeze out the excess liquid. To more specifically explain with reference to FIG. 18, first, the paper-like intermediate structure X is sequentially unwinded from the roll of the polyimide fiber paper intermediate structure X and soaked in the polyimide solution and/or polyimide precursor solution in a bath, and then the nipping is carried out. This intermediate structure X is sequentially passed through a drying chamber at 100° C. and a drying chamber at 120° C., further passed through a drying chamber at 140° C., and then winded up to form the polyimide fiber paper intermediate structure Z1. Besides, a spraying method is also conceivable. If a polyimide concentration in the solution is 5% or lower, the dispersion can be achieved by the latter splaying method. However, if the concentration is 15% to 25%, the polyimide solution and/or polyimide precursor has a viscosity like gum syrup, and thus dispersion using the impregnation machine is preferable.

<Polyimide Solution and/or Polyimide Precursor>

The polyimide solution refers to a solution containing the polyimide and polyimide precursor. In general, as the non-thermoplastic polyimide manufacturing method, a synthesis method called a two-step method is most common. For example, the equimolar amount of tetracarboxylic acid dianhydride and diamine as raw materials are polymerized to obtain a polyamide acid (also called a polyamic acid) that is a polyimide precursor.

This polyamide acid is heated, or progressively dehydrated/cyclized (imidized) using a catalyst to obtain a polyimide.

Most of polyimides having industrially used structures are, in a state of a polyamide acid structure, are soluble in an organic solvent, but are insoluble in a state of a polyimide. Thus, when used for molding or coating, the polyimide is used in a form of the polyamide acid solution, and the solution is dried to obtain a desired film, molded product, or coating film, which is subsequently imidized to obtain a polyimide.

Figure 8A:
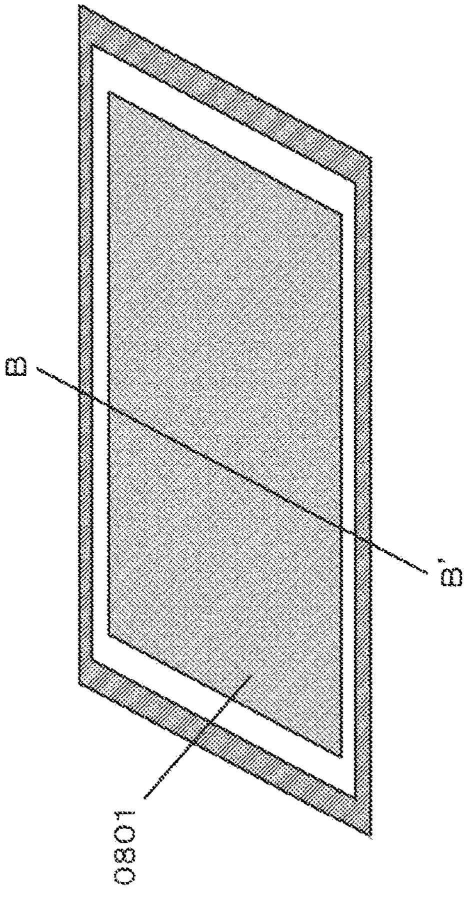
FIGS. 8(*a*) and 8(*b*) are conceptual diagrams of a state that a polyimide solution and/or polyimide precursor is dispersed in the intermediate structure X in an intermediate structure Z1 forming step in manufacture of the polyimide fiber paper using the thermoplastic polymer in Embodiment 2.
Figure 8B:
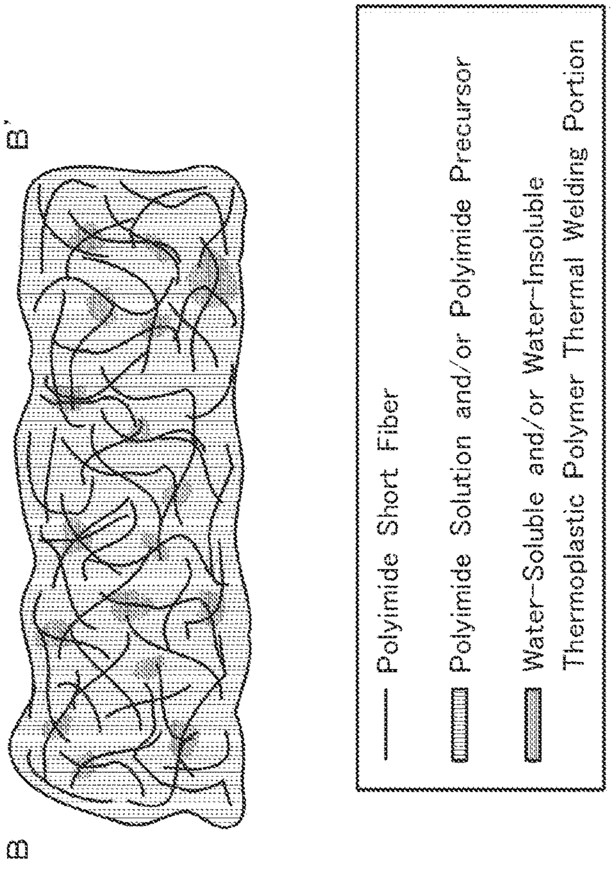

FIGS. 8(*a*) and 8(*b*) are conceptual diagrams illustrating a state that the polyimide solution or polyimide precursor is impregnated in the fiber paper intermediate structure. FIG. 8(*a*) is a conceptual overview of the polyimide fiber paper intermediate structure X impregnated with the polyimide solution and/or polyimide precursor. FIG. 8(*b*) is a sectional view taken along B-B in the upper figure. As illustrated in FIG. 8(*b*), the polyimide solution or polyimide precursor penetrates into gaps between the polyimide short fibers and water-soluble and/or water-insoluble thermoplastic polymer to cover whole of the polyimide fiber paper intermediate structure X.

The intermediate structure X having the dispersed polyimide solution and/or polyimide precursor is wet, and when dried again, it becomes the intermediate structure Z1. In the step of drying the intermediate structure X having the dispersed polyimide solution and/or polyimide precursor, a solvent contained in the polyimide solution and/or polyimide precursor solution is evaporated to precipitate solid contents in the solution. For example, as illustrated in FIG. 18, when this step is continuously performed with unwinding the winded intermediate structure, a process composed of three stages is conceivable, in which, using an air-through dryer, the intermediate structure is heated at around 100° C. that is the evaporation temperature of water at the first stage, heated at around 100° C. to 120° C. at the second stage, and heated at around 140° C. at the third stage (see FIG. 18). In this way, the temperature of the intermediate structure X body is gradually increased by raising the heating temperature stepwise, so that the intermediate structure Z1 can be manufactured without cracks, breakage, or discoloration.

Similarly to the polyimide fiber paper intermediate structure X, the intermediate structure Z1 is a material having a polyimide content of about 80% to 90%, which characteristically can be easily laminated (e.g., on a metal, paper made of a so-called pulp, or a resin) and molded while maintaining high effects of the polyimide such as heat insulation, heat resistance, and electric insulation.

Embodiment 3

Embodiment 3 mainly corresponds to claim 3.

Embodiment 3. Summary

This embodiment of the present invention relates to a method for manufacturing a polyimide fiber paper intermediate structure Y1 by dispersing a polyimide solution and/or polyimide precursor in the polyimide fiber paper intermediate structure X manufactured by the manufacture method in Embodiment 1, and pressing the heated intermediate structure X.

Embodiment 3. Configuration of Invention

Figure 9:
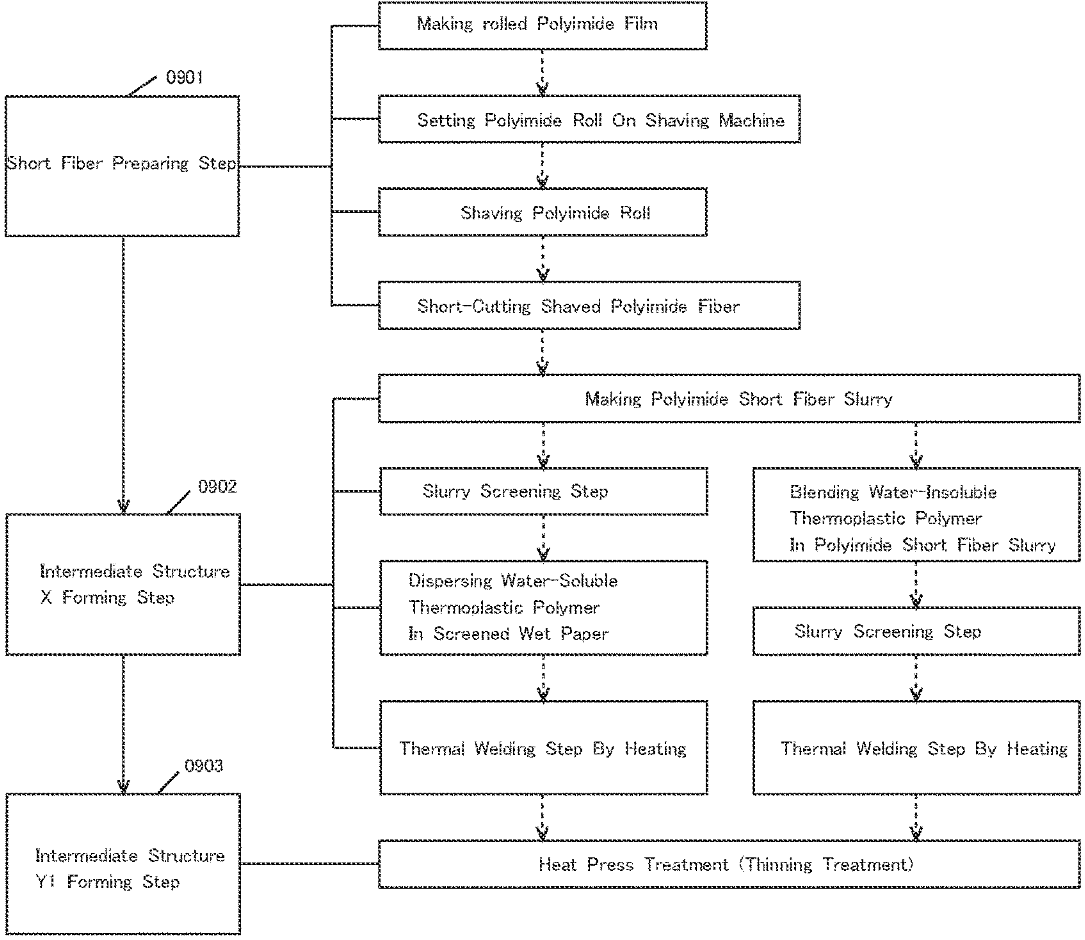
FIG. 9 is a flow chart illustrating an example of a method for manufacturing an intermediate structure Y1 in manufacture of a polyimide fiber paper using a thermoplastic polymer in Embodiment 3.

The manufacture method in this embodiment of the present invention includes a short fiber preparing step 0901, an intermediate structure X forming step 0902, and an intermediate structure Y1 forming step 0903, as illustrated in FIG. 9.

Embodiment 3. Description of Configuration

Embodiment 3. Description of Configuration: Short Fiber Preparing Step

In the short fiber preparing step 0901 in Embodiment 3, shaved short fibers of the non-thermoplastic polyimide are prepared. In this step, polyimide fibers shaved from a polyimide film are subjected to short-cutting to form polyimide short fibers in the same manner as in the short fiber preparing step 0101 described in Embodiment 1. Since the description of each step, the materials used in each step, and the materials prepared in each step have already been explained in Embodiment 1, explanation thereof is omitted.

Embodiment 3. Description of Configuration: Intermediate Structure X Forming Step In the intermediate structure X forming step 0902 of Embodiment 3, the polyimide intermediate structure X is formed in which the short fibers are temporarily bonded using a water-soluble and/or water-insoluble thermoplastic polymer having a melting point lower than a glass transition point of the polyimide. Similarly to the intermediate structure X forming step 0102 described in Embodiment 1, the intermediate structure X forming step 0902 in Embodiment 3 includes: the "water-soluble thermoplastic polymer dispersing step in which the slurry obtained by dispersing the shaved polyimide short fibers in water is screened and then the water-soluble thermoplastic polymer is dispersed therein" and/or the "water-insoluble thermoplastic polymer dispersing step in which the binder-dispersed slurry obtained by dispersing the water-insoluble thermoplastic polymer as the binder in the slurry obtained by dispersing the shaved polyimide short fibers in water"; as well as the "intermediate structure X manufacturing step in which the wet paper is dried by heating, and the water-soluble and/or water-insoluble thermoplastic polymer as the binder melts during heating to temporarily bond the polymer by thermal welding". Since each of these steps is similar to the intermediate structure X forming step 0102 in Embodiment 1 and has already been explained, explanation thereof is omitted in the present embodiment.

Figure 19:
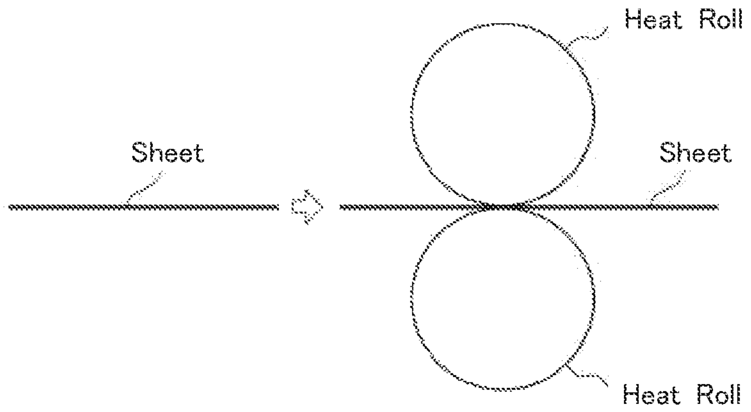
FIG. 19 is a schematic configuration diagram of a calendaring machine in the present embodiments.
Figure 20:
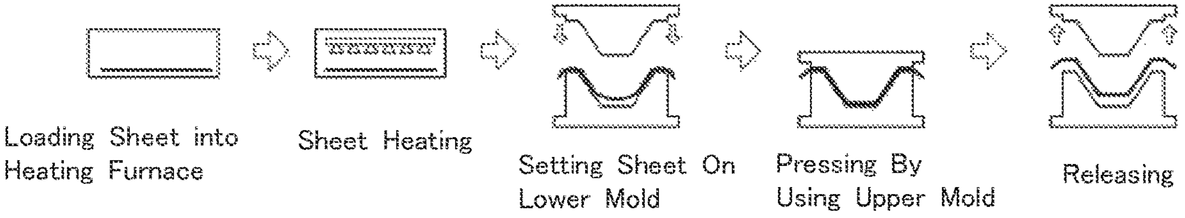
FIG. 20 is a schematic configuration diagram of a heat-press molding machine in the present embodiments.
Figure 21:
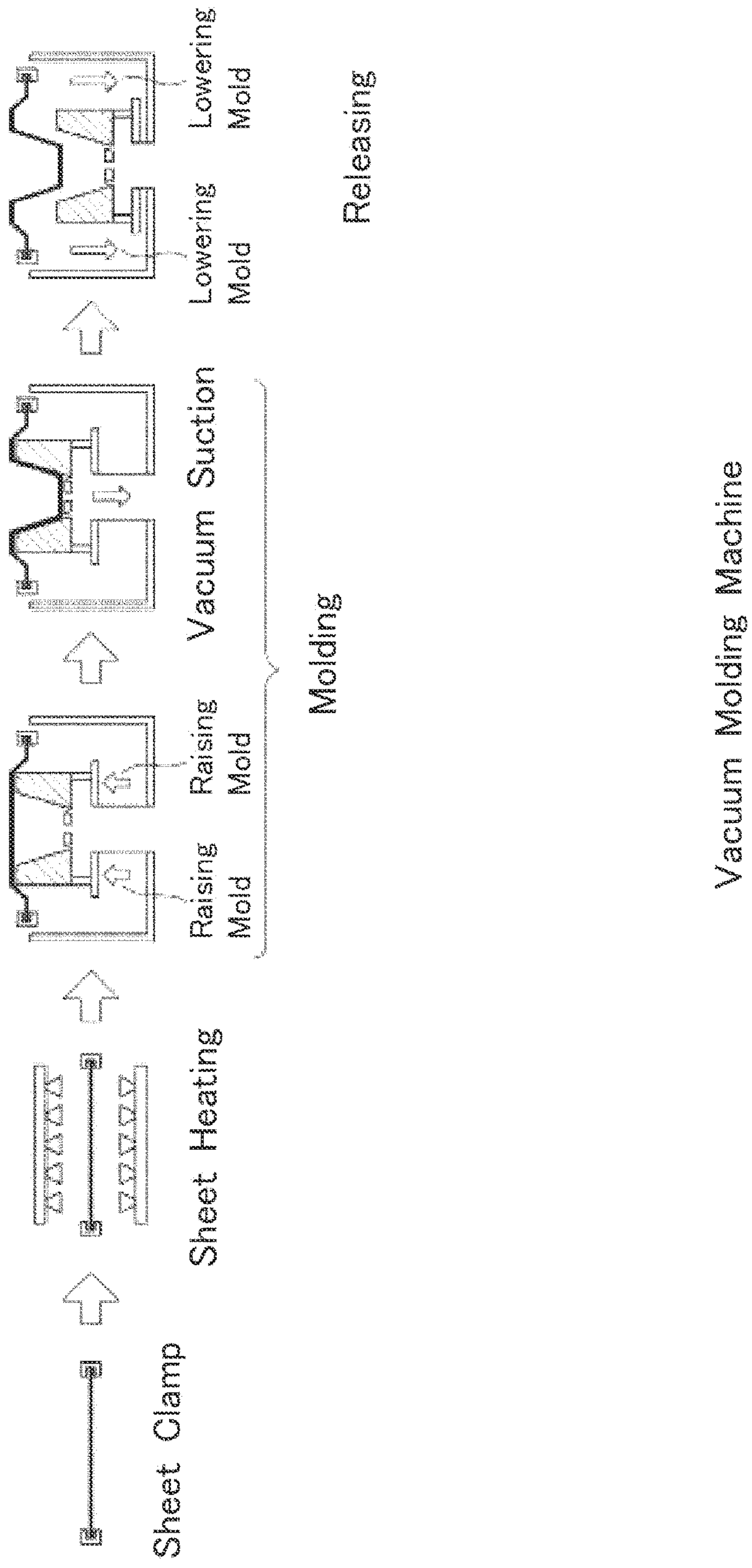
FIG. 21 is a schematic configuration diagram of a vacuum molding machine in the present embodiments.

Embodiment 3. Description of Configuration: Intermediate Structure Y1 Forming Step In the "intermediate structure Y1 forming step" 0903, the polyimide fiber paper intermediate structure Y1 is formed by pressing the heated polyimide fiber paper intermediate structure X to decrease its thickness. The method for pressing the heated polyimide short fiber intermediate structure X may be a method in which a processing machine (generally, a typical example is a calendering machine) equipped with rollers as illustrated in FIG. 19 is used, and the intermediate structure X (sheet) is inserted between the two heated rollers (heat rolls illustrated in FIG. 19) for processing. Besides, a method using a heat-press molding machine as illustrated in FIG. 20 and a vacuum molding machine as illustrated in FIG. 21 are conceivable. When using the heat-press molding machine or the vacuum molding machine, the intermediate structure can be molded so that it can be used as a heat insulating material for complicated parts such as engines of automobiles, aircrafts, or the like.

In FIG. 20, the intermediate structure X (sheet) is loaded as a sheet into a heating furnace and softened by sheet heating, and the softened sheet is set on a lower mold, pressed using an upper mold, and released from the molds so that the sheet can be molded by heat press as a part such as a heat insulating material.

In FIG. 21, the intermediate structure X (sheet) is heated while being clamped, and then, before cooling and solidification, the molds is raised, and the space between the sheet and the mold is vacuum-suctioned, the sheet is molded in close contact with the mold, so that a predetermined shape can be obtained.

The heating and pressurization by pressing make it possible to prevent expansion of the intermediate structure X and to thin the intermediate structure X to a desired thickness. The heating is carried out at a temperature equal to or higher than the melting point of the thermoplastic polymer. When the thermoplastic polymer is a polylactic acid, the heating temperature is preferably within a range of 120° C. to 200° C. If the heating temperature is lower than 100° C., the thickness of the intermediate structure X is not evenly thinned even by pressurization. If the heating temperature is higher than 200° C., the intermediate structure X may crack, tear, or discolor.

Similarly to each intermediate structure illustrated in Embodiment 1 or Embodiment 2, the intermediate structure Y1 is a material having a polyimide content of about 75% to 85%. Furthermore, the intermediate structure Y1 can be manufactured as a sterically molded product and can be manufactured as a material prepared by further thinning the intermediate structure X, so that the intermediate structure Y1 can be used as a heat insulation material or an electric insulation material for a precision equipment. Similarly to each intermediate structure described in any of Embodiments 1 to 3, since the intermediate structure Y1 can be laminated on a metal, paper made of so-called pulp, or a resin, it can also be used by being molded/laminated as a material for covering a wide area, e.g., used as a heat insulation material placed in gaps between parts of a vehicle.

Embodiment 4

Embodiment 4 mainly corresponds to claim 4.

Embodiment 4. Summary

This embodiment of the present invention relates to a method for manufacturing a polyimide fiber paper intermediate structure Y2 by heating the polyimide fiber paper intermediate structure X manufactured by the manufacture method in Embodiment 1.

Embodiment 4. Configuration of Invention

Figure 10:
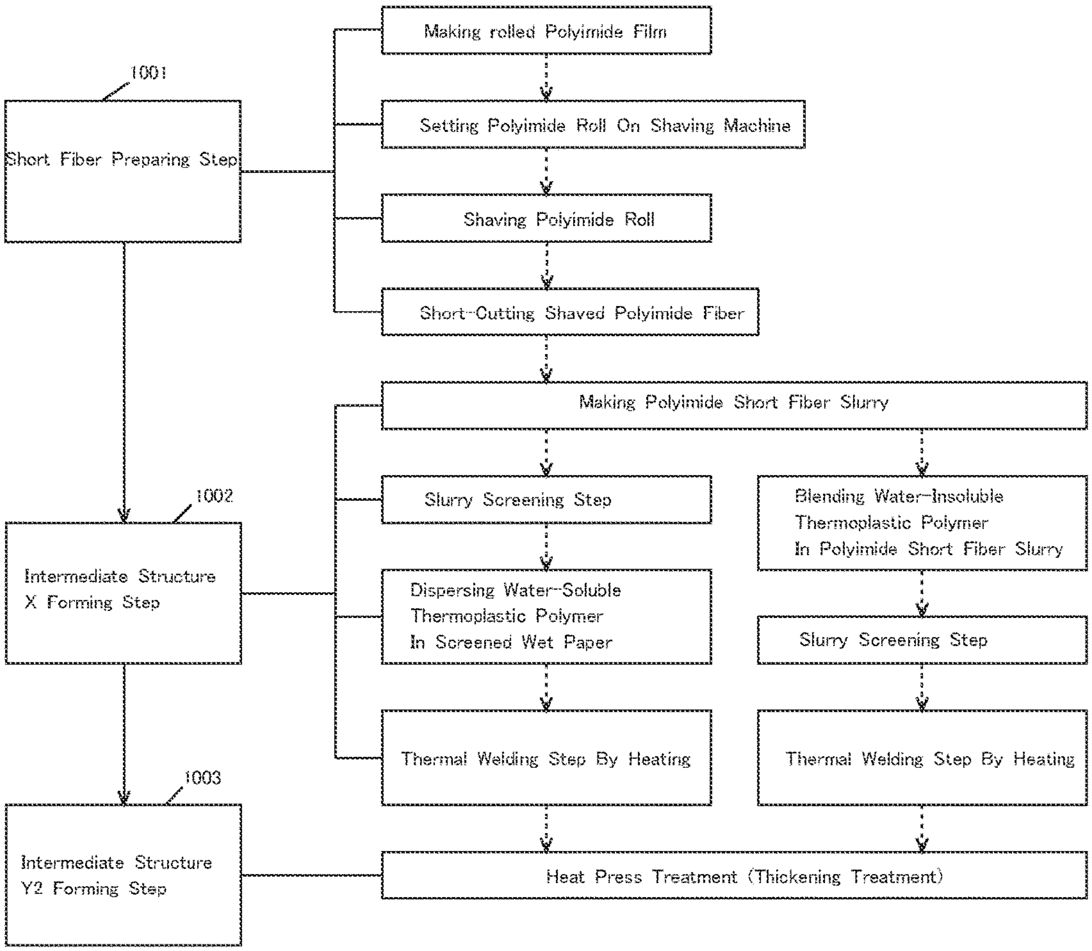
FIG. 10 is a flow chart illustrating an example of a method for manufacturing an intermediate structure Y2 in manufacture of a polyimide fiber paper using a thermoplastic polymer in Embodiment 4.

The manufacture method in this embodiment of the present invention includes a short fiber preparing step 1001, an intermediate structure X forming step 1002, and an intermediate structure Y2 forming step 1003, as illustrated in FIG. 10.

Embodiment 4. Description of Configuration

Embodiment 4. Description of Configuration: Short Fiber Preparing Step

In the short fiber preparing step 1001 in Embodiment 4, shaved short fibers of the non-thermoplastic polyimide are prepared. In this step, polyimide fibers shaved from a polyimide film are subjected to short-cutting to form polyimide short fibers in the same manner as in the short fiber preparing step 0101 described in Embodiment 1. Since the description of each step, the materials used in each step, and the materials prepared in each step have already been explained in Embodiment 1, explanation thereof is omitted.

Embodiment 4. Description of Configuration: Intermediate Structure X Forming Step In the intermediate structure X forming step 1002 of Embodiment 4, the polyimide intermediate structure X is formed in which the short fibers are temporarily bonded using a water-soluble and/or water-insoluble thermoplastic polymer having a melting point lower than a glass transition point of the polyimide. Similarly to the intermediate structure X forming step described in Embodiment 1, the intermediate structure X forming step 1002 in Embodiment 4 includes: the "water-soluble thermoplastic polymer dispersing step in which the slurry obtained by dispersing the shaved polyimide short fibers in water is screened and then the water-soluble thermoplastic polymer is dispersed therein" and/or the "water-insoluble thermoplastic polymer dispersing step in which the binder-dispersed slurry obtained by dispersing the water-insoluble thermoplastic polymer as the binder in the slurry obtained by dispersing the shaved polyimide short fibers in water"; as well as the "intermediate structure X manufacturing step in which the wet paper is dried by heating, and the water-soluble and/or water-insoluble thermoplastic polymer as the binder melts during heating to temporarily bond the polymer by thermal welding". Since each of these steps is similar to the intermediate structure X forming step in Embodiment 1 and has already been explained, explanation thereof is omitted in the present embodiment.

Embodiment 4. Description of Configuration: Intermediate Structure Y2 Forming Step In the "intermediate structure Y2 forming step" 1003, the polyimide fiber paper intermediate structure Y2 is formed by heating the polyimide fiber paper intermediate structure X. Hating allows expansion of the intermediate structure X. The wet paper in the intermediate structure X forming step 1002 is sufficiently dried and then heated so that the intermediate structure X expands as if a balloon is inflated. Since the degree of expansion depends on the heating temperature and the heating time, the degree of expansion can be adjusted by adjusting the heating temperature and the heating time according to the purpose of use.

Figure 22:
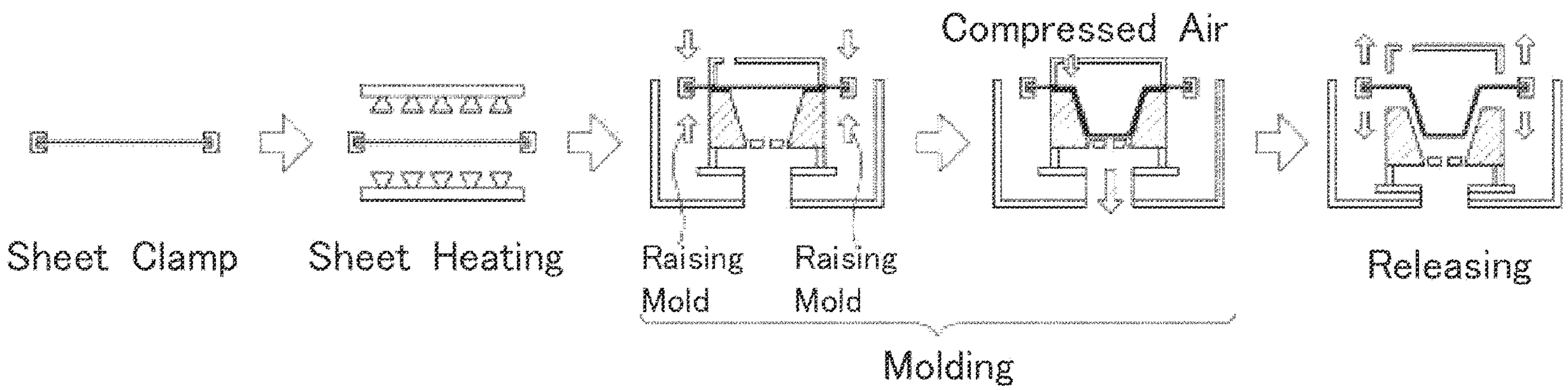
FIG. 22 is a schematic configuration diagram of an air-pressure molding machine in the present embodiments.
Figure 23:
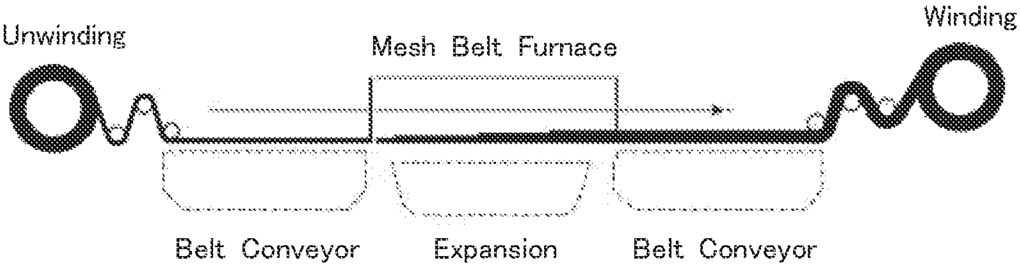
FIG. 23 is a schematic configuration diagram of a mesh belt furnace in the present embodiments.

In this intermediate structure Y2 forming step, the intermediate structure Y2 may be processed using a mesh belt furnace as illustrated in FIG. 23. A roll processing can be carried out by melting the thermoplastic polymer in a mesh belt furnace and expanding the thickness of the intermediate structure Y2. In FIG. 23, the roll processing can be carried out by: unwinding the roll; conveying the unwinded sheet of the thermoplastic polymer by a belt conveyor; melting the thermoplastic polymer in the mesh belt furnace; and conveying the molten thermoplastic polymer by the belt conveyor while expanding the thickness of the intermediate structure Y2. Also, an air-pressure molding machine as illustrated in FIG. 22 can be used. The sheet (polyimide fiber paper intermediate structure X) is heated and softened while being clamped on the mold, and then, before cooling and solidification, the mold is raised, and the sheet is brought into close contact with the mold by a force of compressed air (3 to 6 kg/cm$^2$), so that a predetermined shape can be obtained.

Similarly to each intermediate structure described in any of Embodiment 1 to Embodiment 3, the intermediate structure Y2 is a material having a polyimide content of about 75% to 85%. Since a volume of the intermediate structure Y2 can be increased by expansion, it can be used as a high heat-resistant heat insulation material or the like for a part requiring a light weight and a large thickness.

Embodiment 5

Embodiment 5 mainly corresponds to claim 5.

Embodiment 5. Summary

This embodiment of the present invention relates to a method for manufacturing a polyimide fiber paper intermediate structure Z2 manufactured by dispersing a polyimide solution and/or polyimide precursor in the polyimide fiber paper intermediate structure Y1 manufactured by the manufacture method in Embodiment 3.

Embodiment 5. Configuration of Invention

Figure 11:
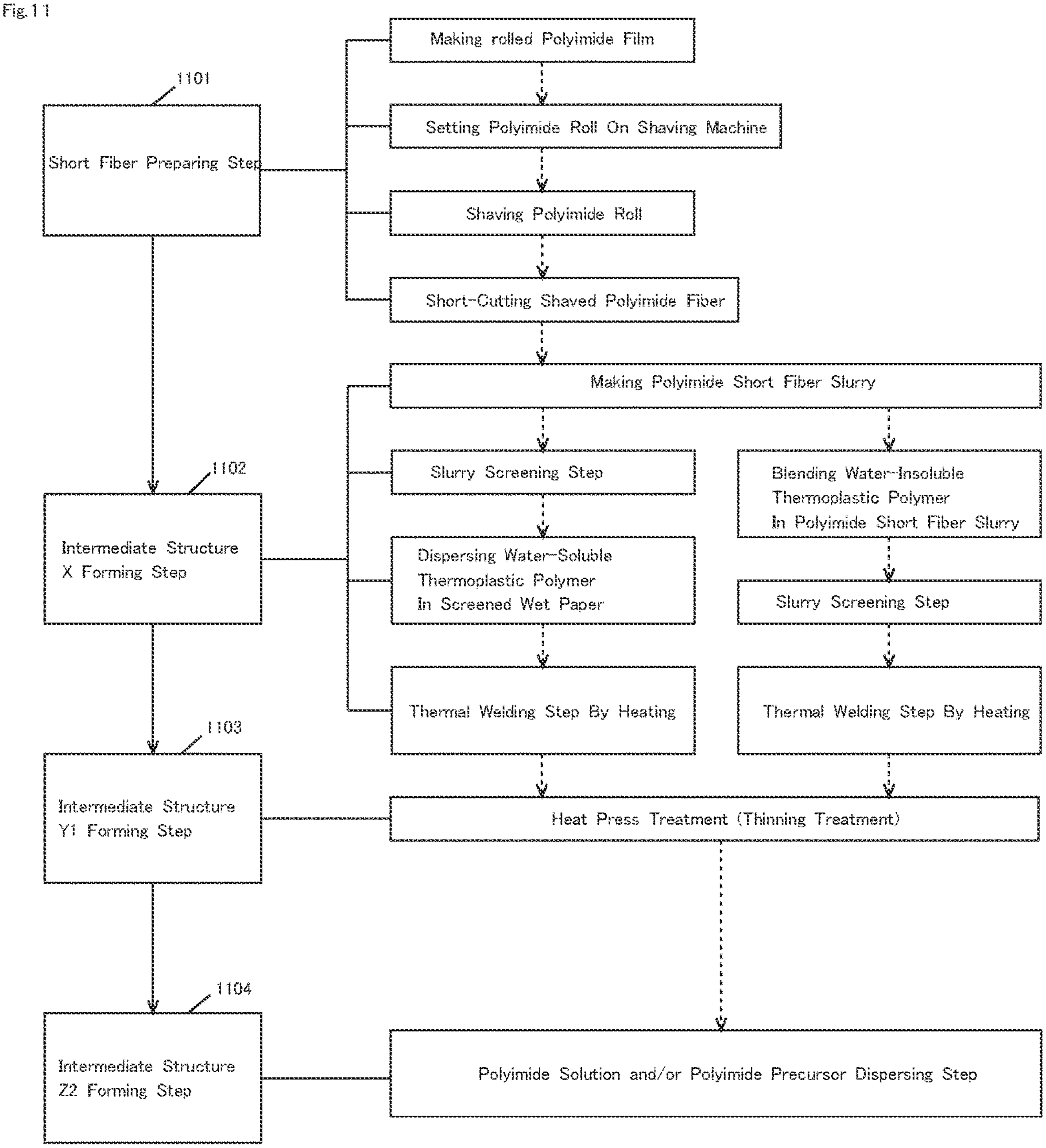
FIG. 11 is a flow chart illustrating an example of a method for manufacturing an intermediate structure Z2 in manufacture of a polyimide fiber paper using a thermoplastic polymer in Embodiment 5.

The manufacture method in this embodiment of the present invention includes a short fiber preparing step 1101, an intermediate structure X forming step 1102, a polyimide fiber paper intermediate structure Y1 forming step 1103, and a polyimide fiber paper intermediate structure Z2 forming step 1104, as illustrated in FIG. 11.

Embodiment 5. Description of Configuration: Short Fiber Preparing Step

In the short fiber preparing step 1101 in Embodiment 5, shaved short fibers of the non-thermoplastic polyimide are prepared. In this step, polyimide fibers shaved from a polyimide film are subjected to short-cutting to form polyimide short fibers in the same manner as in the short fiber preparing step 0101 described in Embodiment 1. Since the description of each step, the materials used in each step, and the materials prepared in each step have already been explained in Embodiment 1, explanation thereof is omitted.

Embodiment 5. Description of Configuration: Intermediate Structure X Forming Step In the intermediate structure X forming step 1102 of Embodiment 5, the polyimide intermediate structure X is formed in which the short fibers are temporarily bonded using a water-soluble and/or water-insoluble thermoplastic polymer having a melting point lower than a glass transition point of the polyimide. Similarly to the intermediate structure X forming step 0102 described in Embodiment 1, the intermediate structure X forming step 1102 in Embodiment 5 includes: the "water-soluble thermoplastic polymer dispersing step in which the slurry obtained by dispersing the shaved polyimide short fibers in water is screened and then the water-soluble thermoplastic polymer is dispersed therein" and/or the "water-insoluble thermoplastic polymer dispersing step in which the binder-dispersed slurry obtained by dispersing the water-insoluble thermoplastic polymer as the binder in the slurry obtained by dispersing the shaved polyimide short fibers in water"; as well as the "intermediate structure X manufacturing step in which the wet paper is dried by heating, and the water-soluble and/or water-insoluble thermoplastic polymer as the binder melts during heating to temporarily bond the polymer by thermal welding". Since each of these steps is similar to the intermediate structure X forming step 0102 in Embodiment 1 and has already been explained, explanation thereof is omitted in the present embodiment.

Example 5. Description of Configuration: Intermediate Structure Y1 Forming Step In the "intermediate structure Y1 forming step" 1103, the polyimide fiber paper intermediate structure Y1 is formed by pressing the heated polyimide fiber paper intermediate structure X to decrease its thickness. Since the method for pressing the heated polyimide short fiber intermediate structure X in the intermediate structure Y1 forming step 1103 is the same as in Embodiment 3 and has already been explained in Embodiment 3, explanation thereof is omitted.

Embodiment 5. Configuration of Invention: Polyimide Fiber Paper Intermediate Structure Z2 Forming Step In the "polyimide fiber paper intermediate structure Z2 forming step" 1104, the polyimide fiber paper intermediate structure Z2 is formed by dispersing the polyimide solution and/or polyimide precursor in the polyimide fiber paper intermediate structure Y1. The step 1104 includes a step of dispersing the polyimide solution and/or polyimide precursor and drying them in the same manner as the intermediate structure Z1 forming step 0703 described in Embodiment 2. The intermediate structure Y1 is a material that has been heat pressed in the intermediate structure Y1 forming step 1103, into which the polyimide solution and/or polyimide precursor are dispersed. A penetrance of the polyimide solution and/or polyimide precursor into the intermediate structure Y1 in the thickness direction can be controlled depending on a porosity attributed to the pressing. The intermediate structure having a very small porosity may have a substantially three-layered structure. The polyimide dispersing method has already been explained in Embodiment 2. Since the step of drying the wet paper having the dispersed polyimide solution and/or polyimide precursor has already been explained in Embodiment 2, explanation thereof is omitted.

Similarly to the polyimide fiber paper intermediate structure X and the intermediate structure Y1, the intermediate structure Z2 is a material having a polyimide content of about 80% to 90%, which characteristically can be easily laminated on a metal, paper made of a so-called pulp, or a resin and molded while maintaining high effects of the polyimide such as heat insulation, heat resistance, and electric insulation.

Embodiment 6

Embodiment 6 mainly corresponds to claim 6.

Embodiment 6. Summary

This embodiment of the present invention relates to a method for manufacturing a polyimide fiber paper intermediate structure Z3 manufactured by dispersing a polyimide solution and/or polyimide precursor in the polyimide fiber paper intermediate structure Y2 manufactured by the manufacture method in Embodiment 4.

Embodiment 6. Configuration of Invention

Figure 12:
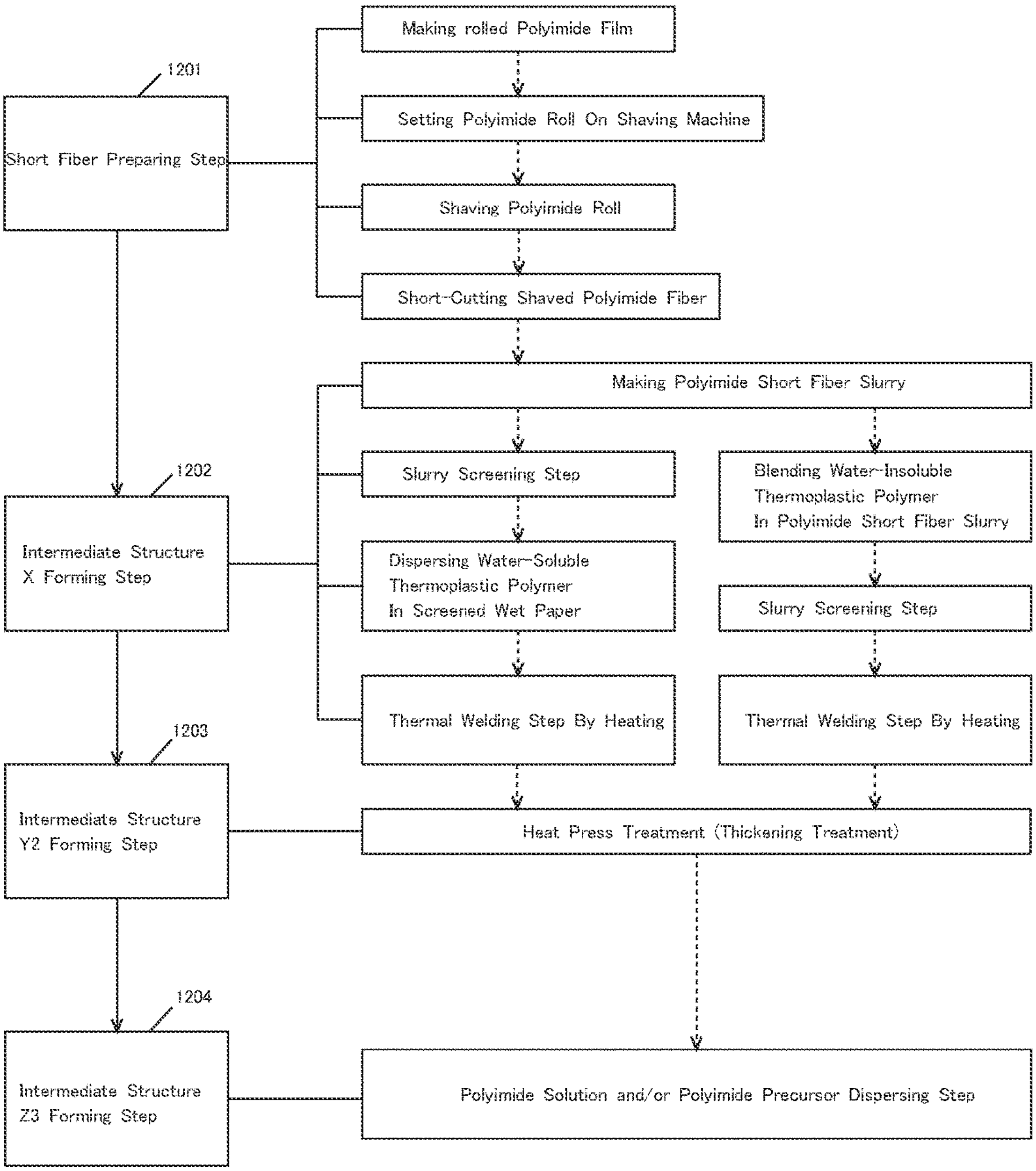
FIG. 12 is a flow chart illustrating an example of a method for manufacturing an intermediate structure Z3 in manufacture of a polyimide fiber paper using a thermoplastic polymer in Embodiment 6.

The manufacture method in this embodiment of the present invention includes a short fiber preparing step 1201, an intermediate structure X forming step 1202, a polyimide fiber paper intermediate structure Y2 forming step 1203, and a polyimide fiber paper intermediate structure Z3 forming step 1204, as illustrated in FIG. 12.

Embodiment 6. Description of Configuration: Short Fiber Preparing Step

In the short fiber preparing step 1201 in Embodiment 6, shaved short fibers of the non-thermoplastic polyimide are prepared. In this step, polyimide fibers shaved from a polyimide film are subjected to short-cutting to form polyimide short fibers in the same manner as in the short fiber preparing step 0101 described in Embodiment 1. Since the description of each step, the materials used in each step, and the materials prepared in each step have already been explained in Embodiment 1, explanation thereof is omitted.

Embodiment 6. Description of Configuration: Intermediate Structure X Forming Step In the intermediate structure X forming step 1202 of Embodiment 6, the polyimide intermediate structure X is formed in which the short fibers are temporarily bonded using a water-soluble and/or water-insoluble thermoplastic polymer having a melting point lower than a glass transition point of the polyimide. Similarly to the intermediate structure X forming step 0102 described in Embodiment 1, the intermediate structure X forming step 1202 in Embodiment 6 includes: the "water-soluble thermoplastic polymer dispersing step in which the slurry obtained by dispersing the shaved polyimide short fibers in water is screened and then the water-soluble thermoplastic polymer is dispersed therein" and/or the "water-insoluble thermoplastic polymer dispersing step in which the binder-dispersed slurry obtained by dispersing the water-insoluble thermoplastic polymer as the binder in the slurry obtained by dispersing the shaved polyimide short fibers in water"; as well as the "intermediate structure X manufacturing step in which the wet paper is dried by heating, and the water-soluble and/or water-insoluble thermoplastic polymer as the binder melts during heating to temporarily bond the polymer by thermal welding". Since each of these steps is similar to the intermediate structure X forming step 0102 in Embodiment 1 and has already been explained, explanation thereof is omitted in the present embodiment.

Example 6. Description of Configuration: Intermediate Structure Y2 Forming Step

In the "intermediate structure Y2 forming step" 1203, the polyimide fiber paper intermediate structure Y2 is formed by heating the polyimide fiber paper intermediate structure X to decrease its thickness. Similarly to Embodiment 4, the intermediate structure X can be expanded by heating, which has already been explained in Embodiment 4 so that explanation thereof is omitted.

Embodiment 6. Configuration of Invention: Polyimide Fiber Paper Intermediate Structure Z3 Forming Step In the "polyimide fiber paper intermediate structure Z3 forming step" 1204, the polyimide fiber paper intermediate structure Z3 is formed by dispersing the polyimide solution and/or polyimide precursor in the polyimide fiber paper intermediate structure Y2. The step 1204 includes a step of dispersing the polyimide solution and/or polyimide precursor and drying them in the same manner as the intermediate structure Z1 forming step 0703 described in Embodiment 2. The intermediate structure Y2 is a material that has been heated and expanded in the intermediate structure Y2 forming step, into which the polyimide solution and/or polyimide precursor are dispersed. The polyimide dispersing method has already been explained in Embodiment 2. Since the step of drying the wet paper having the dispersed polyimide solution and/or polyimide precursor has already been explained in Embodiment 2, explanation thereof is omitted.

Similarly to the polyimide fiber paper intermediate structure X and the intermediate structure Y2, the intermediate structure Z3 is a material having a polyimide content of about 80% to 90%, which characteristically can be easily laminated and molded while maintaining high effects of the polyimide such as heat insulation, heat resistance, and electric insulation.

Embodiment 7

Embodiment 7 mainly corresponds to claim 7.

Embodiment 7. Summary

This embodiment of the present invention relates to a manufacture method for a polyimide fiber paper PP1, which is manufactured by imidizing the polyimide precursor in the polyimide solution and/or the polyimide precursor dispersed not in the form of without taking the form of the polyimide solution that are dispersed in the polyimide fiber paper intermediate structure Z1 forming step of the manufacture method in Embodiment 2.

Embodiment 7. Configuration of Invention

Figure 13:
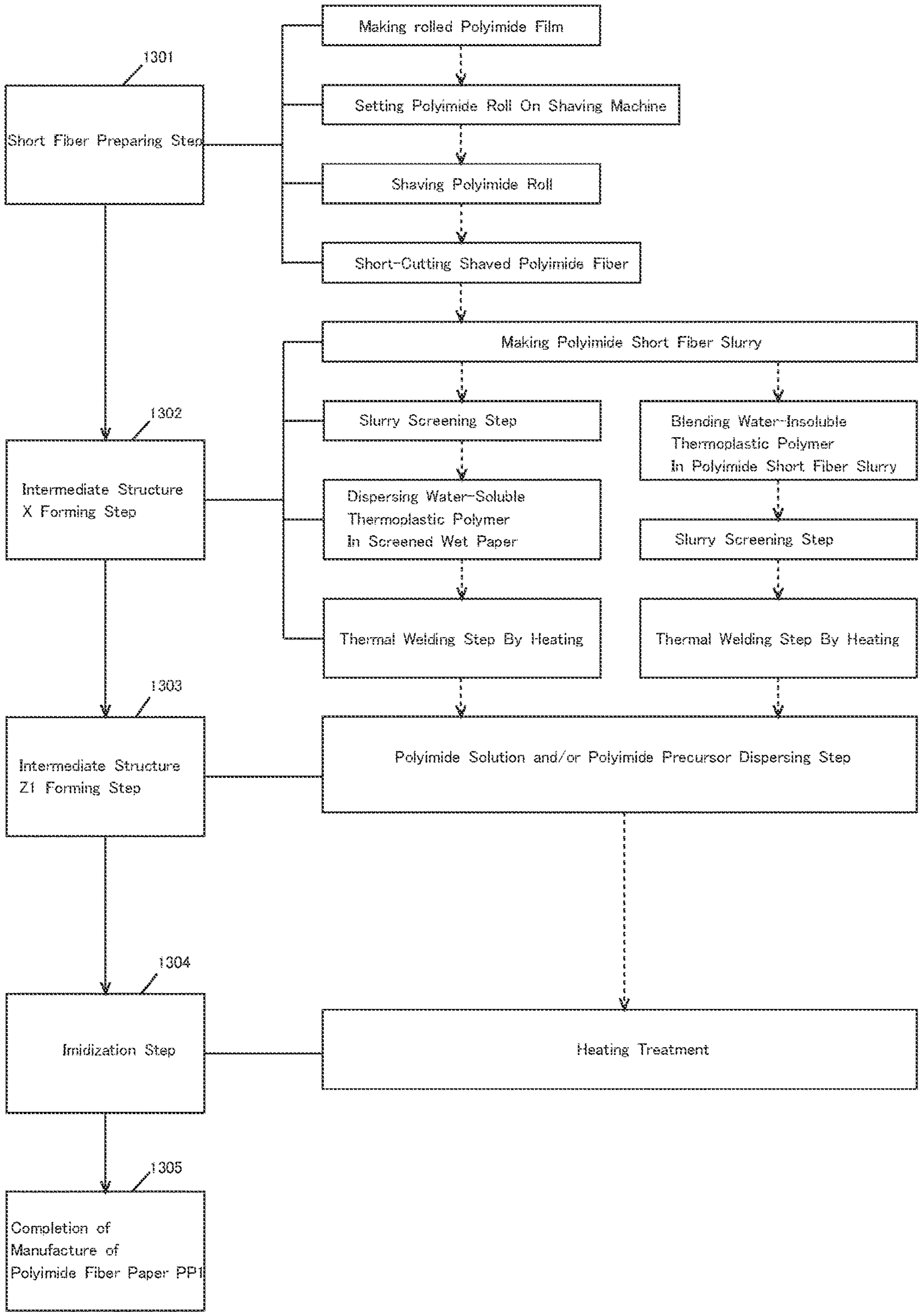
FIG. 13 is a flow chart illustrating an example of a method for manufacturing a polyimide fiber PP1 using a thermoplastic polymer in Embodiment 7.

The manufacture method in this embodiment of the present invention includes a short fiber preparing step 1301, an intermediate structure X forming step 1302, a polyimide fiber paper intermediate structure Z1 forming step 1303, and an imidization step 1304, as illustrated in FIG. 13.

Embodiment 7. Description of Configuration

Embodiment 7. Description of Configuration: Short Fiber Preparing Step

In the short fiber preparing step 1301 in Embodiment 7, shaved short fibers of the non-thermoplastic polyimide are prepared. In this step, polyimide fibers shaved from a polyimide film are subjected to short-cutting to form polyimide short fibers in the same manner as in the short fiber preparing step described in Embodiment 1. Since the description of each step, the materials used in each step, and the materials prepared in each step have already been explained in Embodiment 1, explanation thereof is omitted.

Embodiment 7. Description of Configuration: Intermediate Structure X Forming Step In the intermediate structure X forming step 1302 of Embodiment 7, the polyimide intermediate structure X is formed in which the short fibers are temporarily bonded using a water-soluble and/or water-insoluble thermoplastic polymer having a melting point lower than a glass transition point of the polyimide. Similarly to the intermediate structure X forming step described in Embodiment 1, the intermediate structure X forming step 1302 in Embodiment 7 includes: the "water-soluble thermoplastic polymer dispersing step in which the slurry obtained by dispersing the shaved polyimide short fibers in water is screened and then the water-soluble thermoplastic polymer is dispersed therein" and/or the "water-insoluble thermoplastic polymer dispersing step in which the binder-dispersed slurry obtained by dispersing the water-insoluble thermoplastic polymer as the binder in the slurry obtained by dispersing the shaved polyimide short fibers in water"; as well as the "intermediate structure X manufacturing step in which the wet paper is dried by heating, and the water-soluble and/or water-insoluble thermoplastic polymer as the binder melts during heating to temporarily bond the polymer by thermal welding". Since each of these steps is similar to the intermediate structure X forming step in Embodiment 1 and has already been explained, explanation thereof is omitted in the present embodiment.

Embodiment 7. Configuration of Invention: Intermediate Structure Z1 Forming Step In the "polyimide fiber paper intermediate structure Z1 forming step" 1303, the polyimide fiber paper intermediate structure Z1 is formed by dispersing the polyimide solution and/or polyimide precursor in the polyimide fiber paper intermediate structure Y1. The step 1303 includes a step of dispersing the polyimide solution and/or polyimide precursor and drying them in the same manner as the intermediate structure Z1 forming step described in Embodiment 2. Since the polyimide dispersing method and the step of drying the wet paper having the dispersed polyimide solution and/or polyimide precursor have already been explained in Embodiment 2, explanation thereof is omitted.

Embodiment 7. Configuration of Invention: Imidization Step

In the "imidization step" 1304, the polyimide precursor contained in the polyimide solution, or the polyimide precursor dispersed not in the form of without taking the form of the polyimide solution in the polyimide fiber paper intermediate structure Z1 is imidized. By imidization, the polyimide short fibers are not chemically but mechanically fixed by bonding. Since the imidization reaction occurs by heating the polyimide precursor to a high temperature, the intermediate structure Z1 having the dispersed polyimide solution or polyimide precursor is heated in the imidization step 1304. The heating temperature in the imidization step is 200° C. or higher. The imidization reaction gradually occurs from when the temperature exceeds 200° C., but the reaction rate is low. When the heating is carried out at 300° C. or higher, the imidization reaction rate becomes high. Thus, the imidization step is preferably carried out at 300° C. or higher if possible.

At the imidization reaction stage, the thermally welded water-soluble or water-insoluble thermoplastic polymer may be thermally decomposed and disappear as a whole, or a portion of the polymer may remain as a thermally degenerated substance. In the manufacture in the present embodiment, an amount of the thermally degenerated substance remaining after the imidization step 1304 is not so large, and the obtained fiber paper can be said as an almost 100% polyimide fiber paper. Thus, there is no significant difference in the efficacy from the 100% polyimide fiber paper.

The polyimide fiber paper PP1 formed through the imidization step 1304 can have an almost 100% polyimide content, but depending on the type and amount of the water-soluble and/or water-insoluble thermoplastic polymer used in the intermediate structure X forming step 1302, and/or depending on adjustment of a heating temperature, a heating time, a degree of pressurization, a pressurization time, or the like in each step, the polyimide fiber PP1 having a polyimide content of lower than 100% can also be formed by leaving the water-soluble or water-insoluble thermoplastic polymer, or a thermally-degenerated product or a chemical derivative of the thermoplastic polymer in the polyimide fiber paper. If the pressurization is carried out during the imidization step, the finished polyimide fiber paper PP1 is thin, and if no pressurization is carried out, the polyimide fiber paper PP1 has the same thickness as of the intermediate structure Z1.

Embodiment 8

Embodiment 8 mainly corresponds to claim 8.

Embodiment 8. Summary

This embodiment of the present invention relates to a manufacture method for a polyimide fiber paper PP2, which is manufactured by imidizing the polyimide precursor in the polyimide solution and/or the polyimide precursor dispersed without taking the form of the polyimide solution that are dispersed in the polyimide fiber paper intermediate structure Z2 forming step of the manufacture method in Embodiment 5.

Embodiment 8. Configuration of Invention

Figure 14:
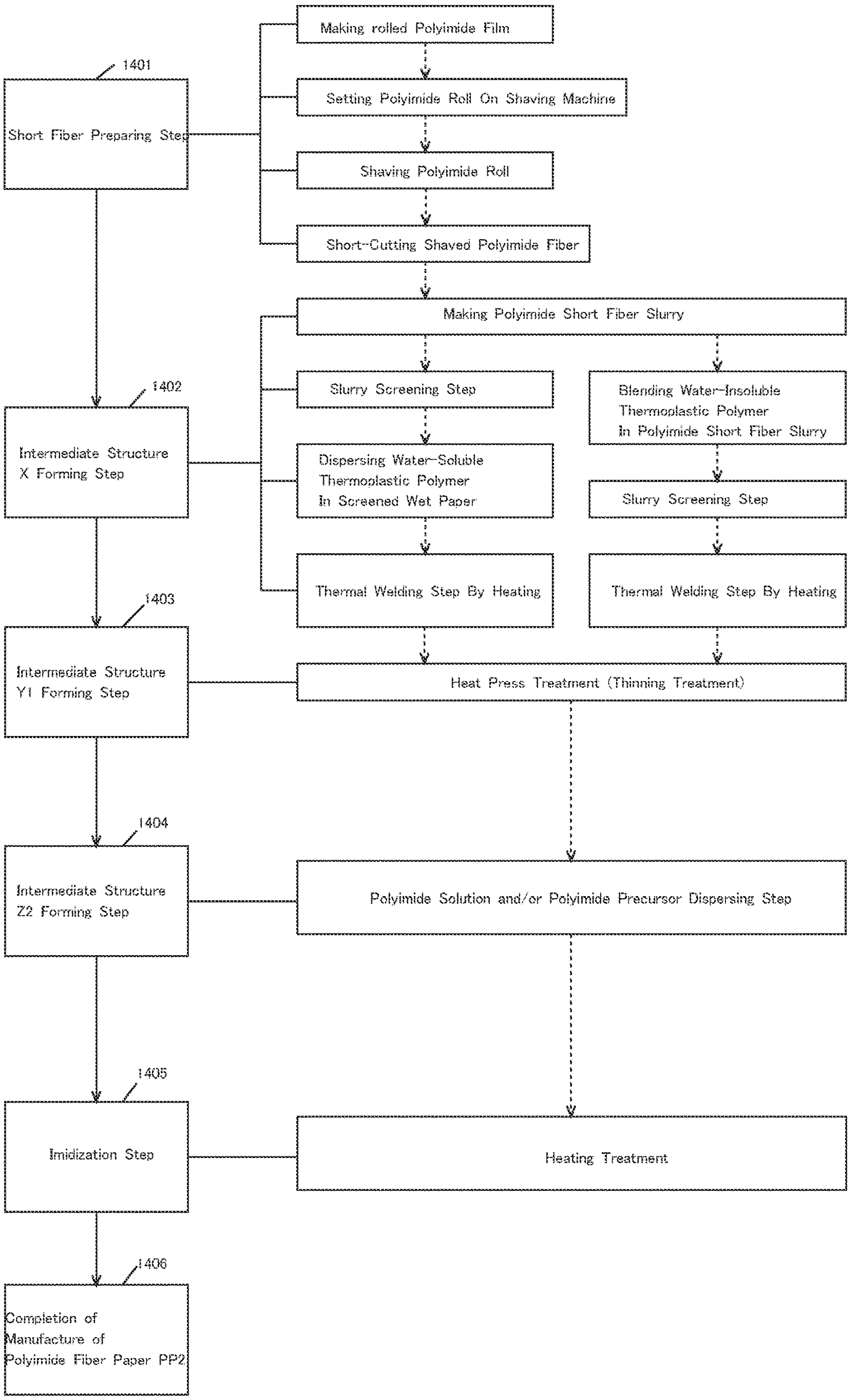
FIG. 14 is a flow chart illustrating an example of a method for manufacturing a polyimide fiber PP2 using a thermoplastic polymer in Embodiment 8.

The manufacture method in this embodiment of the present invention includes a short fiber preparing step 1401, an intermediate structure X forming step 1402, an intermediate structure Y1 forming step 1403, a polyimide fiber paper intermediate structure Z2 forming step 1404, and an imidization step 1405, as illustrated in FIG. 14.

Embodiment 8. Description of Configuration

Embodiment 8. Description of Configuration: Short Fiber Preparing Step

In the short fiber preparing step 1401 in Embodiment 8, shaved short fibers of the non-thermoplastic polyimide are prepared. In this step, polyimide fibers shaved from a polyimide film are subjected to short-cutting to form polyimide short fibers in the same manner as in the short fiber preparing step described in Embodiment 1. Since the description of each step, the materials used in each step, and the materials prepared in each step have already been explained in Embodiment 1, explanation thereof is omitted.

Embodiment 8. Description of Configuration: Intermediate Structure X Forming Step In the intermediate structure X forming step 1402 of Embodiment 8, the polyimide intermediate structure X is formed in which the short fibers are temporarily bonded using a water-soluble and/or water-insoluble thermoplastic polymer having a melting point lower than a glass transition point of the polyimide. Similarly to the intermediate structure X forming step described in Embodiment 1, the intermediate structure X forming step 1402 in Embodiment 8 includes: the "water-soluble thermoplastic polymer dispersing step in which the slurry obtained by dispersing the shaved polyimide short fibers in water is screened and then the water-soluble thermoplastic polymer is dispersed therein" and/or the "water-insoluble thermoplastic polymer dispersing step in which the binder-dispersed slurry obtained by dispersing the water-insoluble thermoplastic polymer as the binder in the slurry obtained by dispersing the shaved polyimide short fibers in water"; as well as the "intermediate structure X manufacturing step in which the wet paper is dried by heating, and the water-soluble and/or water-insoluble thermoplastic polymer as the binder melts during heating to temporarily bond the polymer by thermal welding". Since each of these steps is similar to the intermediate structure X forming step in Embodiment 1 and has already been explained, explanation thereof is omitted in the present embodiment.

Example 8. Description of Configuration: Intermediate Structure Y1 Forming Step In the "intermediate structure Y1 forming step" 1403, the polyimide fiber paper intermediate structure Y1 is formed by pressing the heated polyimide fiber paper intermediate structure X to decrease its thickness. Since the method for pressing the heated polyimide short fiber intermediate structure X in the intermediate structure Y1 forming step 1403 is the same as in Embodiment 3 and has already been explained in Embodiment 3, explanation thereof is omitted.

Embodiment 8. Configuration of Invention: Polyimide Fiber Paper Intermediate Structure Z2 Forming Step In the "polyimide fiber paper intermediate structure Z2 forming step" 1404, the polyimide fiber paper intermediate structure Z2 is formed by dispersing the polyimide solution and/or polyimide precursor in the polyimide fiber paper intermediate structure Y1. The step 1404 includes a step of dispersing the polyimide solution and/or polyimide precursor and drying them in the same manner as the intermediate structure Z1 forming step 0703 described in Embodiment 2. The intermediate structure Y1 is a material that has been heat pressed in the intermediate structure Y1 forming step, into which the polyimide solution and/or polyimide precursor are dispersed. The polyimide dispersing method has already been explained in Embodiment 2. Since the step of drying the wet paper having the dispersed polyimide solution and/or polyimide precursor has already been explained in Embodiment 2, explanation thereof is omitted.

Embodiment 8. Description of Invention: Imidization Step

In the "imidization step" 1405, the polyimide precursor contained in the polyimide solution, or the polyimide precursor dispersed without taking the form of the polyimide solution in the polyimide fiber paper intermediate structure Z2 is imidized. Similarly to Embodiment 7, by imidization, the polyimide short fibers are fixed by bonding. Since the imidization reaction step 1405 is the same as in Embodiment 7 and has already been explained in Embodiment 7, explanation thereof is omitted.

The polyimide fiber paper PP2 formed through the imidization step 1405 can have an almost 100% polyimide content. Depending on the type and amount of the water-soluble and/or water-insoluble thermoplastic polymer used in the intermediate structure X forming step, and/or depending on adjustment of a heating temperature, a heating time, a degree of pressurization, a pressurization time, or the like in each step, the polyimide fiber PP2 having a polyimide content of lower than 100% can also be formed by leaving the water-soluble or water-insoluble thermoplastic polymer in the polyimide fiber paper. If the pressurization is carried out during the imidization step 1405, the finished polyimide fiber paper PP2 is thin, and if no pressurization is carried out, the polyimide fiber paper PP2 has the same thickness as of the intermediate structure Z2.

Embodiment 9

Embodiment 9 mainly corresponds to claim 9.

Embodiment 9. Summary

This embodiment of the present invention relates to a manufacture method for a polyimide fiber paper PP3, which is manufactured by imidizing the polyimide precursor in the polyimide solution and/or the polyimide precursor dispersed not in the form of without taking the form of the polyimide solution that are dispersed in the polyimide fiber paper intermediate structure Z3 forming step 1204 of the manufacture method in Embodiment 6.

Embodiment 9. Configuration of Invention

Figure 15:
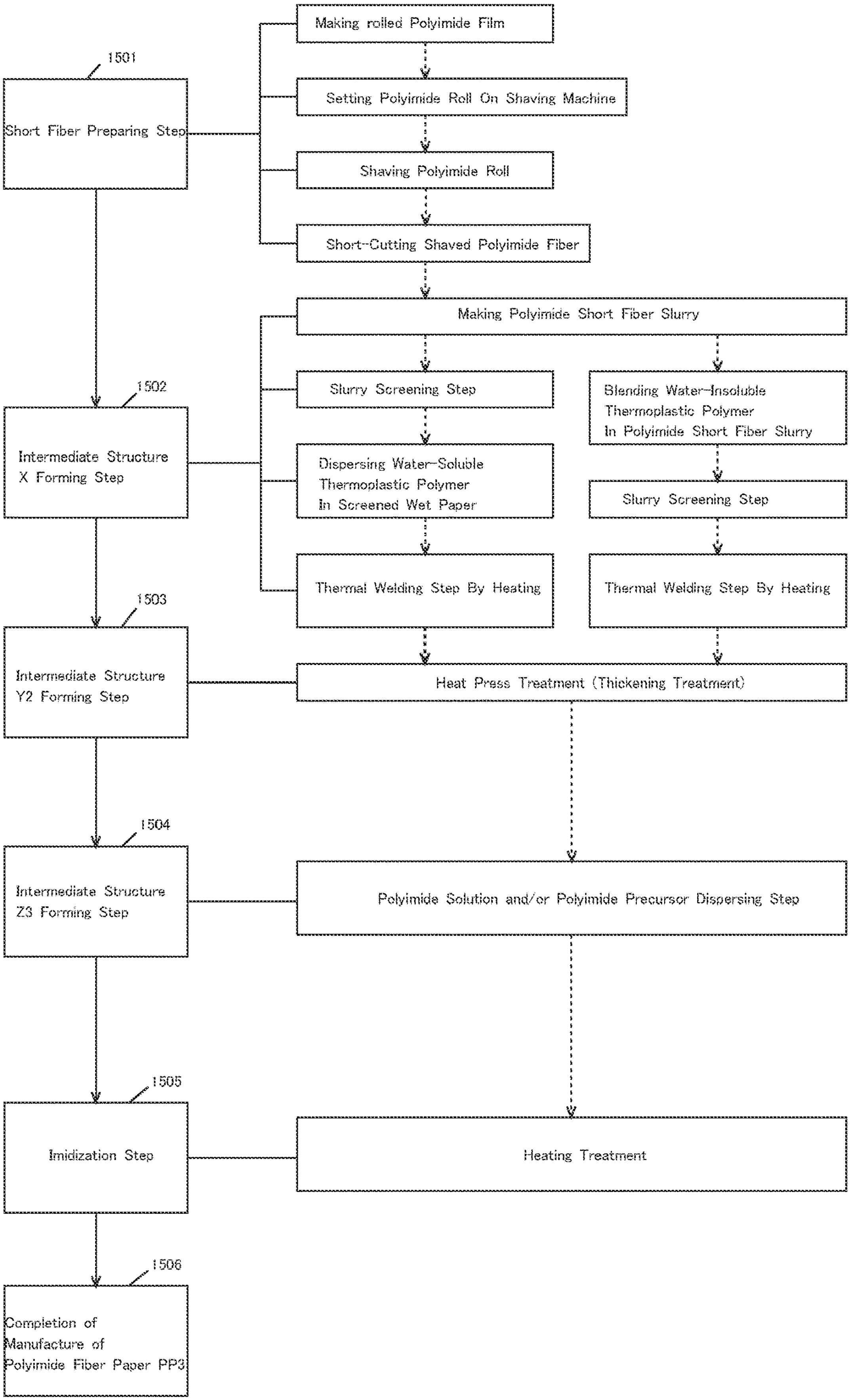
FIG. 15 is a flow chart illustrating an example of a method for manufacturing a polyimide fiber PP3 using a thermoplastic polymer in Embodiment 9.

The manufacture method in this embodiment of the present invention includes a short fiber preparing step 1501, an intermediate structure X forming step 1502, an intermediate structure Y2 forming step 1503, a polyimide fiber paper intermediate structure Z3 forming step 1504, and an imidization step 1505, as illustrated in FIG. 15.

Embodiment 9. Description of Configuration: Short Fiber Preparing Step

In the short fiber preparing step 1501 in Embodiment 9, shaved short fibers of the non-thermoplastic polyimide are prepared. In this step, polyimide fibers shaved from a polyimide film are subjected to short-cutting to form polyimide short fibers in the same manner as in the short fiber preparing step 0101 described in Embodiment 1. Since the description of each step, the materials used in each step, and the materials prepared in each step have already been explained in Embodiment 1, explanation thereof is omitted.

Embodiment 9. Description of Configuration: Intermediate Structure X Forming Step In the intermediate structure X forming step 1502 of Embodiment 9, the polyimide intermediate structure X is formed in which the short fibers are temporarily bonded using a water-soluble and/or water-insoluble thermoplastic polymer having a melting point lower than a glass transition point of the polyimide. Similarly to the intermediate structure X forming step described in Embodiment 1, the intermediate structure X forming step 1502 in Embodiment 9 includes: the "water-soluble thermoplastic polymer dispersing step in which the slurry obtained by dispersing the shaved polyimide short fibers in water is screened and then the water-soluble thermoplastic polymer is dispersed therein" and/or the "water-insoluble thermoplastic polymer dispersing step in which the binder-dispersed slurry obtained by dispersing the water-insoluble thermoplastic polymer as the binder in the slurry obtained by dispersing the shaved polyimide short fibers in water"; as well as the "intermediate structure X manufacturing step in which the wet paper is dried by heating, and the water-soluble and/or water-insoluble thermoplastic polymer as the binder melts during heating to temporarily bond the polymer by thermal welding". Since each of these steps is similar to the intermediate structure X forming step in Embodiment 1 and has already been explained, explanation thereof is omitted in the present embodiment.

Example 9. Description of Configuration: Intermediate Structure Y2 Forming Step In the "intermediate structure Y2 forming step" 1503, the polyimide fiber paper intermediate structure Y2 is formed by heating the polyimide fiber paper intermediate structure X. Similarly to Embodiment 4, the intermediate structure X can be expanded by heating and pressing, which has already been explained in Embodiment 4 so that explanation thereof is omitted.

Embodiment 9. Configuration of Invention: Polyimide Fiber Paper Intermediate Structure Z3 Forming Step In the "polyimide fiber paper intermediate structure Z3 forming step" 1504, the polyimide fiber paper intermediate structure Z3 is formed by dispersing the polyimide solution and/or polyimide precursor in the polyimide fiber paper intermediate structure Y2. The step 1504 includes a step of dispersing the polyimide solution and/or polyimide precursor and drying them in the same manner as the intermediate structure Z1 forming step 0703 described in Embodiment 2. The intermediate structure Y2 is a material that has been heated and expanded in the intermediate structure Y2 forming step 1503, into which the polyimide solution and/or polyimide precursor are dispersed. The polyimide dispersing method has already been explained in Embodiment 2. Since the step of drying the wet paper having the dispersed polyimide solution and/or polyimide precursor has already been explained in Embodiment 2, explanation thereof is omitted.

Embodiment 9. Description of Invention: Imidization Step

In the "imidization step" 1505, the polyimide precursor contained in the polyimide solution, or the polyimide precursor dispersed without taking the form of the polyimide solution in the polyimide fiber paper intermediate structure Z3 is imidized. Similarly to Embodiment 7, by imidization, the polyimide short fibers are fixed by bonding. Since the imidization reaction step 1505 is the same as in Embodiment 7 and has already been explained in Embodiment 7, explanation thereof is omitted.

The polyimide fiber paper PP3 formed through the imidization step 1505 can have an almost 100% polyimide content. Depending on the type and amount of the water-soluble and/or water-insoluble thermoplastic polymer used in the intermediate structure X forming step 1502, and/or depending on adjustment of a heating temperature, a heating time, a degree of pressurization, a pressurization time, or the like in each step, the polyimide fiber PP3 having a polyimide content of lower than 100% can also be formed by leaving the water-soluble or water-insoluble thermoplastic polymer in the polyimide fiber paper. If the pressurization is carried out during the imidization step 1505, the finished polyimide fiber paper PP3 is thin, and if no pressurization is carried out, the polyimide fiber paper PP3 has the same thickness as of the intermediate structure Z3.

The invention claimed is:

1. A method for manufacturing a polyimide fiber material, the method comprising:

a short fiber preparing step for preparing shaved short fibers of a non-thermoplastic polyimide, fiber lengths of the short fivers being in a range of 1 mm to 10 mm; and an intermediate structure X forming step for forming a polyimide fiber paper intermediate structure X in which the short fibers are temporarily bonded using a water-insoluble thermoplastic polymer having a melting point lower than a glass transition point of a polyimide.

2. The method for manufacturing the polyimide fiber material according to claim 1, further comprising:

an intermediate structure Z1 forming step for forming a polyimide fiber paper intermediate structure Z1 by dispersing a polyimide solution and/or polyimide precursor in the polyimide fiber paper intermediate structure X.

3. The method for manufacturing the polyimide fiber material according to claim 1, further comprising:

a polyimide fiber paper intermediate structure Y1 forming step for forming a polyimide fiber paper intermediate structure Y1 by pressing the polyimide fiber paper intermediate structure X under a heated condition to decrease its thickness.

4. The method for manufacturing the polyimide fiber material according to claim 1, further comprising:

a polyimide fiber paper intermediate structure Y2 forming step for forming a polyimide fiber paper intermediate structure Y2 by heating the polyimide fiber paper intermediate structure X to increase its thickness.

5. The method for manufacturing the polyimide fiber material according to claim 3, further comprising:

a polyimide fiber paper intermediate structure Z2 forming step for forming a polyimide fiber paper intermediate structure Z2 by dispersing a polyimide solution and/or polyimide precursor in the polyimide fiber paper intermediate structure Y1.

6. The method for manufacturing the polyimide fiber material according to claim 4, further comprising:

a polyimide fiber paper intermediate structure Z3 forming step for forming a polyimide fiber paper intermediate structure Z3 by dispersing a polyimide solution and/or polyimide precursor in the polyimide fiber paper intermediate structure Y2.

7. The method for manufacturing, the polyimide fiber material according to claim 2, further comprising:

an imidization step for imidizing the polyimide precursor contained in the polyimide solution or the polyimide precursor dispersed not in the form of the polyimide solution in the polyimide fiber paper intermediate structure Z1, wherein the polyimide fiber material is polyimide fiber paper PP1.

8. The method for manufacturing the polyimide fiber material according to claim 5, further comprising:

an imidization step for imidizing the polyimide precursor contained in the polyimide solution or the polyimide precursor dispersed not in the form of the polyimide solution in the polyimide fiber paper intermediate structure Z2, wherein the polyimide fiber material is polyimide fiber paper PP2.

9. The method for manufacturing the polyimide fiber material according to claim 6, further comprising:

an imidization step for imidizing the polyimide precursor contained in the polyimide solution or the polyimide precursor dispersed not in the form of the polyimide solution in the polyimide fiber paper intermediate structure Z3, wherein the polyimide fiber material is polyimide fiber paper PP3.

* * * * *